United States Patent [19]

Biçak

[11] Patent Number: 6,153,795
[45] Date of Patent: Nov. 28, 2000

[54] ETHYLENEIMINE-CONTAINING RESINS, MANUFACTURE, AND USE FOR CHEMICAL SEPARATIONS

[75] Inventor: Niyazi Biçak, Istanbul, Turkey

[73] Assignee: AAG Industries, Inc., Dorchester, Mass.

[21] Appl. No.: 08/906,622

[22] Filed: Aug. 7, 1997

Related U.S. Application Data

[60] Provisional application No. 60/023,490, Aug. 9, 1996, and provisional application No. 60/044,202, Apr. 22, 1997.

[51] Int. Cl.$^7$ .................................................. C07C 311/16
[52] U.S. Cl. .............................................. 564/84; 564/81
[58] Field of Search ..................... 523/400, 411, 523/420, 421; 423/385; 588/6, 206, 207; 564/84, 107, 114, 511, 512, 94; 568/425, 448, 454

[56] References Cited

U.S. PATENT DOCUMENTS

| | | |
|---|---|---|
| 2,469,683 | 5/1949 | Dudley et al. . |
| 2,898,310 | 8/1959 | Greer . |
| 4,139,510 | 2/1979 | Anderson . |
| 4,328,142 | 5/1982 | Hertel et al. . |
| 4,355,116 | 10/1982 | Lee et al. .................................. 521/27 |
| 4,670,160 | 6/1987 | Moriya et al. . |
| 4,670,180 | 6/1987 | Moriya et al. . |
| 5,116,887 | 5/1992 | Fisher et al. . |
| 5,288,918 | 2/1994 | Maher ...................................... 568/454 |

FOREIGN PATENT DOCUMENTS

| | | |
|---|---|---|
| 50023389 | 3/1975 | Japan . |
| 08003220 | 1/1996 | Japan . |

OTHER PUBLICATIONS

Langevin et al; J.Membr.Sci., 82(1–2), 51–63, 1993.
Cassidy et al, Gov.Rep.Announce.Index (US), 84(17),119, 1984.
Ford et al, J.Polym.Sci.,Polym.Chem.Ed., 20(5), 1213–29, 1982.
Goldstein et al, Isr. J. Chem., 10(5), 893–8, 1972.

*Primary Examiner*—Sreeni Padmanabhan

[57] ABSTRACT

Water-insoluble polymer resins containing ethylenediamine subunits which are N-substituted with a functional group chosen from the group consisting of —H, —$CS_2$, —$CH_2PO_3H$, and —$CH_3$, or which are N-quarternized as —[$N(CH_3)_2^{\oplus\ominus}OH$]—, and polysalts of these. The use of such resins in separating nitrites, organic chlorine compounds, (heavy) metal ions including radioactive metal ions, counteranions of metal ions, and aliphatic and aromatic aldehydes from dilute aqueous solutions, especially at low concentrations. A method of synthesizing epoxy carbamate resins without violent reaction by inverse suspension condensation in cold liquid paraffin or toluene, preferably with dimethyl formamide or 1-methyl-2-pyrrolidone as co-solvents.

6 Claims, 18 Drawing Sheets

Table 1. Aldehyde sorption charcteristics of the resin.

| Aldehyde | loading[b] capacity (mmol g$^{-1}$ resin) | rate constant of sorption (mol$^{-1}$ sec$^{-1}$ resin) | percentage[c] aldehyde releasing |
|---|---|---|---|
| Acetaldehyde[a] | 3.94 | 8.1·10$^{-3}$ | 46.0% |
| Butyraldehyde | 6.60 | 1.94·10$^{-2}$ | 52.7% |
| Benzaldehyde | 5.66 | 1.63·10$^{-2}$ | 43.6% |
| Salicylaldehyde | 5.83 | 1.71·10$^{-2}$ | 67.6% |

(a) by necleting aldol products  (b) in 3 h  (c) with 1 M HCl in 24 h

FIG. 6

Table 2. Metal sorption characteristics of crosslinked polymer.

| | AAC [a] (m.mol/g resin) | Max. loading (m.mol/g resin) (pH=4.3) | Amine / metal [b] (mol/mol) | Stripped metal ion (m.mol/g resin) [c] |
|---|---|---|---|---|
| Cu(II) | 11.4 | 2.3 | 4.84 | 1.4 |
| Ni(II) | 11.4 | 2.8 | 3.97 | 2.6 |
| Co(II) | 11.4 | 3.7 | 3.02 | 1.8 |
| Cd(II) | 11.4 | 2.0 | 5.57 | 1.8 |
| Cr(III) | 11.4 | 4.7 | 2.37 | 1.2 |
| Fe(II) | 11.4 | 4.5 | 2.47 | 1.6 |

(a) AAC : accessible amine content.
(b) based on the accessible amine content.
(c) by treating with 1 M HCl solution for 30 minutes.

FIG. 11

Table 3. Anion binding characteristics of the crosslinked polymer.

| Metal salts used | Anion | pH of the mixture | Sorbed anion (m.mol/g resin) | Accompanying cation (m.mol/g resin) |
|---|---|---|---|---|
| $CuCl_2.6H_2O$ | $Cl^-$ | 5.1 | 10.0 | 5.1 |
| $NiSO_4$ | $SO_4^{2-}$ | 6.2 | 4.8 | 4.6 |
| $Cd(NO_3)_2$ | $NO_3^-$ | 4.7 | 6.9 | 3.7 |
| $Cd(CH_3COO)_2$ | $CH_3COO^-$ | 4.6 | 6.7 | 3.5 |

FIG. 12

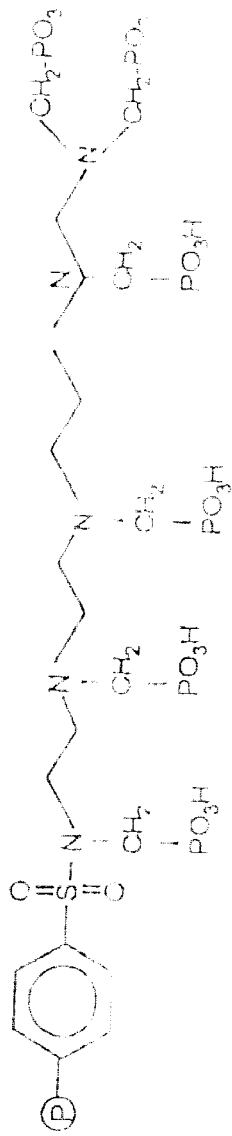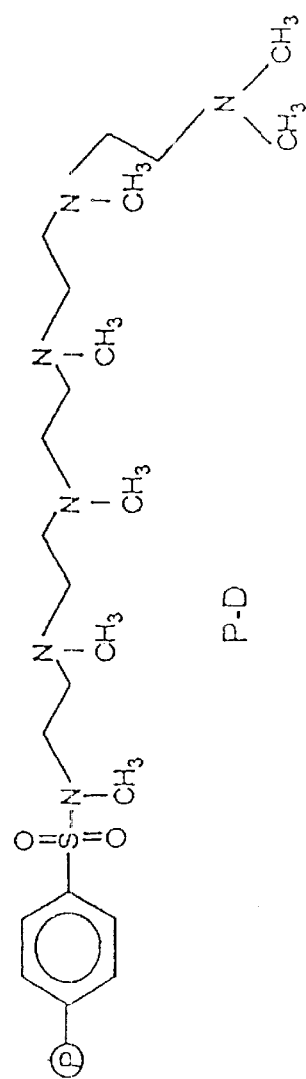
FIG. 21C
FIG. 21D

ETHYLENEIMINE-CONTAINING RESINS, MANUFACTURE, AND USE FOR CHEMICAL SEPARATIONS

CROSS-REFERENCE TO RELATED APPLICATIONS

This application claims the benefit under 35 U.S.C. §119 (e) of co-pending U.S. Provisional Applications Ser. No. 60/023,490, filed Aug. 9, 1996 and U.S. Provisional Application Ser. No. 60/044,202, filed Apr. 22, 1997, both of which are hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

The invention concerns polymeric resins having affinity for specific chemical entities and useful for separation of such chemical entities from solutions in the laboratory or in the environment. No patent is available regarding the use of a polymeric sorbent for nitrite removal. The polystyrene sulfonamide resin with oligoethyleneimine side groups and its further derivatives with phosphomethyl groups and with quaternized forms have not been patented so far. The aldehyde separation concept using nonhydrolysable polymer resin has not been quoted in any patent yet.

BACKGROUND OF THE INVENTION

Polymeric materials are continually being sought which have a special affinity for selected chemical entities either for the purpose of separation of desirable products, such as aldehydes from a reaction mixture, or for removal of unwanted or harmful entities (such as (heavy) metal cations, related anions, nitrites, or chlorine compounds) from such mixtures or from water in the environment. It is desirable that such polymeric materials have high specificity for the chemical entity or entities in question, that they be easily removed from the solution when they have captured the chemical entity in question, and that they be relatively easy to strip of the entity and be regenerated for further use.

For example, isolation of the products from reaction mixtures is one of the most important steps of chemical processes. Polymer-supported extracting agents offer simplicity for isolation of one of the products from these reaction mixtures. Crosslinked polymers are often preferred as support, due to their insolubility. In such a case, isolation of one of the entities is reduced to a simple filtration. If the functional group attached to the crosslinked polymer is selective for a compound targeted, it will be possible to pick it up and separate it easily from the mixture.

In particular, ideal polymeric separating agents for nitrites, organic chlorine compounds, metal ions including readioactive metal ions, counteranions of metal salts and aliphatic and aromatic aldehydes would be highly desirable, and are presently being sought.

In some respects, polymeric protecting agents may also be considered as trapping agents. However, for the case of "protecting", the aim is to protect any functional group of a compound for the next reaction. But in the trapping, a polymeric reagent binds selectively to one of the components of a reaction mixture. This phenomena has been termed a "Fishing out process" [1]. In the literature, there appear many reports on the use of polymeric protecting agents for alcohols [2], aldehydes [3] and carboxylic acids [4]. But, fewer reports appear about polymeric trapping agents. Polymer-supported semicarbazide has been demonstrated to be efficient for removal of small quantities of aldehydes by means involving hydrazide groups [5]. But the regeneration of this polymeric extracting agent is not possible due to the hydrolyzable hydrazide groups and the reagent described is not appropriate for recycling.

Crosslinked polymers bearing various ligating groups are promising materials for hydrometallurgical applications, water purifications etc. Recent attempts have been made to incorporate many different chelating groups into polymeric networks [13, 14]. Although many chelating polymers with high metal-uptake ability have been reported, these materials suffer from hydrolytic instabilities. In view of this, polymers having hydrolyzable or oxidizable groups are not suitable for large scale applications, even though they have good metal-sorption abilities.

The present applicant has demonstrated that all-amine ligating polymers offer advantages of non-hydrolysability, better ability of metal sorption and anion-binding ability. Because in these polymers chelation is expected to occur by formation of cationic metal complexes, the counter-anion of metal salts must also bound-ionically either to the cationic complex being formed, or to the free other amine groups of the polymer. Coordination chemistry of low-molecular-weight amines such as ethylene diamine [16], diethylene triamine [15] have been well-studied in the literature. With these ligands, the counter-anion of the metal complexes formed is hydroxide or the anion of the metal salt involved. Up to the present, few non-hydrolyzable polyamines are known in the literature. These are polyvinyl pyridines, polyethyleneimine, and polyvinylamine. Among these only polyvinyl pyridines and its monomers are commercially available. Polyethyleneimine is obtained either by cationic ring opening of ethylene imine monomer [16] or by hydrolysis of oxazoline polymers [17]. Whereas vinylamine monomer does not exist, its polymer is prepared by hydrolysis of poly(N-vinyl amides) [18, 19] or poly(N-vinyl t-butyl carbamate) [20]. Recently, the applicant has demonstrated that the polymer can also be prepared by Hofmann's N-bromamide method, from polyacrylamide in ethylene glycol [21]. there appear many papers dealing with metal complexes of poly(vinyl pyridines), poly(vinyl amine) and poly(ethyleneimine) in the literature.

Other available amine-containing polymers which have affinity for metal cations (U.S. patents—Moriya et al.: U.S. Pat. Nos. 4,670,160 and 4,670,180) are hampered by excessive water solubility, which makes extraction difficult and sometimes requires separate coagulants (e.g. $FeCl_2$, sodium sulfide, etc), or by unacceptable odor due to incorporation of primary amines or evolution of $H_2S$.

Nitrite ion is one of the most hazardous chemicals which may present in environmental water. Its acid form (nitrous acid) is very reactive towards many organic compounds such as amines, phenols, alcohols etc. Many reactions involving nitrous acid proceed via a free-radical mechanism and these reactions are rapid. With nitrous acid, phenols give ortho- or para-hydroximino derivatives. Alcohols give nitrite esters. Primary amides readily decompose to give carboxylic acid and nitrogen. This approach has been demonstrated to be useful in controlling conversion of polyacrylamide into acrylic acid [28]. Aliphatic primary amines yield an unstable diazo compound which immediately decomposes into alcohol and nitrogen. This reaction is the basis of the Van-Slyke method which is used for the determination of amino acids [29].

Secondary amines or amides yield nitrosamines or nitrosamides respectively. Both products are well-known carcinogenic compounds. Since peptide linkages are secondary amides, nitrous acid is also a very harmful chemical for living organisms.

Furthermore, from an environmental point of view, pollution of water sources arising from nitrite ion is gaining increasing importance, due to extensive exploitation of nitrogen-containing fertilizers. Hence nitrite-removal is a major problem to be solved. An effective special sorbent for the removal of nitrite ions would constitute an important advance in the art.

Moreover, exploration of some compounds for the above uses has been hampered by the danger of unstable and highly exothermic reactions, especially in connection with resins made by combining polyethylene polyamines with epihalohydrins.

The above problems are resolved in a novel and unobvious manner by the present invention.

It is therefore a primary object of the present invention to provide a highly effective polymeric extracting agent for separations and purifications.

More specifically the object of the invention is to provide an agent for effective extraction of nitrite ions, aldehydes, chlorine compounds, metal cations including radioactive ions, (and associated counter-ions), and other chemical entities, even when starting with very low concentrations.

A further object is to provide such a polymeric agent that is insoluble in water or the solvent of the solution in question, so that extraction can be effected by simple filtration without need for separate coagulants.

Another object of the invention is to provide a polyamine polythioagent with no objectionable odor in use.

A still further object is to provide an agent which can be regenerated without acid hydrolysis or other destructive reaction.

Another object of the invention is to provide a method of synthesizing polymers by epoxy ring opening, without the dangers of unstable reaction experienced with the prior art.

Another object is to provide a method of purifying polluted environmental water sources.

These objects and other objects are achieved by the present invention, as taught to those skilled in the art by the present specification and as claimed below.

BRIEF SUMMARY OF THE INVENTION

The invention involves certain classes of polymer resins containing polycarbamate (especially ethylene diamine) subunits in the backbone or in pendent groups, their manufacture, and their use for separations and purifications by affinity for certain chemical entities, especially nitrites, (heavy) metal cations, counter-ions of metal salts, chlorine compounds and aldehydes (aromatic and aliphatic).

In one aspect, the invention involves epoxy resin having dithiocarbamate reactive groups, particularly non-water-soluble epoxy resins derived from ethylene diamine (or other source of secondary amines) and epihalohydrin, transformed into dithiocarbamate forms using NaOH and $CS_2$. The resin is prepared safely by inverse suspension polycondensation in a solvent such as cold liquid paraffin, preferably with dimethyl formamide and/or 1-methyl-2-pyrrolidone as co-solvents.

An hydrochloride form of the resin is especially useful for its affinity for nitrites.

The resin is preferably crosslinked with an excess of epihalohydrin to be insoluble in water, preferably about 10% molar excess.

In a variation, a cross-linked polystyrene sulfonamide resin is provided with -oligoethyleneimine side chains which are similarly useful, especially when N-substituted with $-CH_2PO_3H$, $-CH_3$, and/or quaternized as $-[N(CH_3)_2^{\oplus\ominus}OH]-$.

BRIEF DESCRIPTION OF THE SEVERAL VIEWS OF THE DRAWINGS

FIG. 6 (Table 1) shows experimental aldehyde sorption characteristics of a resin of the invention;

FIG. 11 (Table 2) shows metal-sorption characteristics of a cross-linked polymer according to a form of the present invention;

FIG. 12 (Table 3) shows the anion binding characteristics of a cross-linked polymer according to a form of the present invention;

FIGS. 21A–21E illustrate a variation of the invention involving various modifications of cross-linked polystyrene sufonamides with oligoethyleneimine pendant groups.

DETAILED DESCRIPTION OF THE INVENTION

Various aspects of the invention are described below in more detail under the headings: INSOLUBLE

DITHIOCARBAMATE-CONTAINING EPOXY RESINS; 1,2 DIAMINOETHANE CONTAINING EPOXY RESINS FOR SEPARATION OF ALDEHYDES; REMOVAL OF TRANSITION METAL CATIONS AND THEIR COUNTERANIONS BY CROSSLINKED EPOXY-AMINE POLYMER; REMOVAL OF NITRITE IONS FROM AQUA SOLUTIONS; and CROSSLINKED POLYSTYRENE SULFONAMIDES WITH OLIGOETHYLENEDIAMINES.

Insoluble Dithiocarbamate-Containing Epoxy Resins

One form of the invention relates to a novel epoxy resin having dithiocarbamate reactive groups. More particularly, it relates to an epoxy resin derived from ethylenediamine and a stoichiometric excess of epichlorohydrin and the conversion of the resin into dithiocarbamate form by using NaOH and $CS_2$. In this way, a cross-linked, water-insoluble resin containing dithiocarbamic acid sodium salt is obtained. This polymeric resin is attractive for use in specialized applications. Having dithiocarbamate groups, the resin is extremely reactive towards transitions metal ions at very low concentrations and capable of reacting with halogen compounds. So the resin has potential applications in water purifications and removal of chlorine-containing pesticides and herbicides from water solutions. It is an object of this invention to provide a novel water-insoluble, dithiocarbamate-containing epoxy-amine resin and a process for its manufacture.

This resin is odorless (unlike dithiocarbamates derived from primary amines or those which evolve $H_2S$ in use). This aspect is an important advantage of the resin.

In this part of the description preparation, utilization, and regeneration of dithiocarbamate containing epichlorohydrin-ethylenediamine resin is disclosed. Although here the resin obtained from ethylenediamine is described, this general approach can be extended to all amines which are secondary (bonded to two carbons.)

The following examples are presented as illustrations and not intended as limitations on the process.

Figure 1:
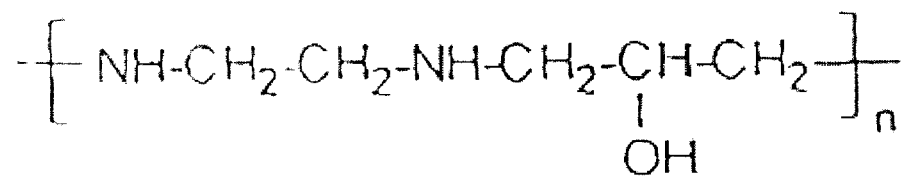
FIG. 1 is the basic unit of ethylene diamine-epihalohydrin polymer resin.

The repeating unit of epichlorohydrin-ethylenediamine crosslinked polymer (I) is shown in FIG. 1.

A mixture of 5.8 g (0.1 mol) ethylenediamine and 10.17 g (0.11 mol) epichlorohydrin and 10 ml dimethylformamide is added to 35 ml of liquid paraffin below 5° C. The mixture is stirred for 6 h then heated to 45° C. for 8 h. The granular product is isolated by filtration and dispersed in boiling alcohol. After filtering, the product is dried in vacuo at 40° C. for 12 h. The nitrous acid test represents that the product does not contain primary amine functionalities. The amounts of components can be varied to obtain materials with different porosity.

Figure 2:
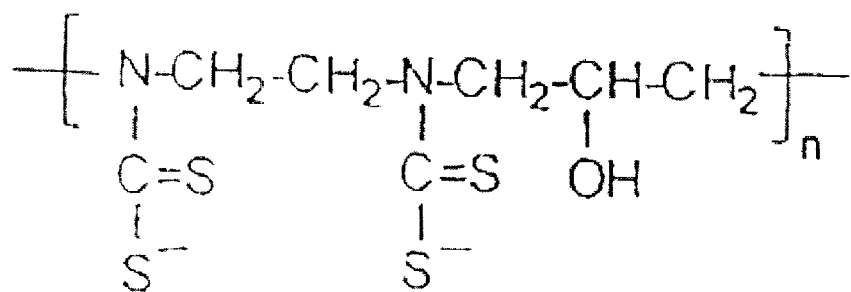
FIG. 2 is a unit of the resin with dithiocarbamate functionality.

Modification of the product (I) with $CS_2$ to dithiocarbamate functionality (II) is illustrated in FIG. 2. 10 g of I is placed 100 ml volume of flask ad 50 ml $CS_2$ is added to the flask. The flask is closed and left overnight. The swelled resin is filtered and washed with 25 ml of ethanol. Then the sample is dispersed in a solution of 8 g NaOH in 50 ml ethanol. The mixture is stirred at room temperature for 18 h. The content of the bottle is filtered and washed with 50 ml ethanol and dried at room temperature under vacuo for 12 h. The product is ready for use. It is important that, having been derived from secondary amines, the product has no objectionable odor.

Cleaning-up of chlorinated wastes by resin II.

Figure 3:
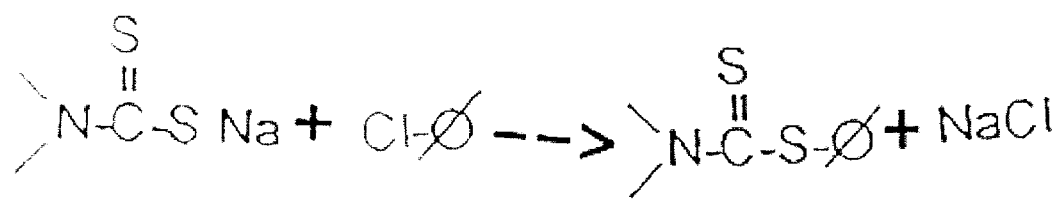
FIG. 3 shows the reaction of the Na salt of the resin with a chlorinated benzene derivative.

The resin II is odorless and extremely reactive towards aliphatic chlorides such as DDT (neocid). Depending on practical conditions, the degree of functionalization is between 32% and 96%. It substitutes rapidly with the chloride to give corresponding dithiocarbamic acid esters and NaCl eliminates. Hence by the resin II, organic chlorides are converted into NaCl. Chlorinated benzene derivatives can also be destroyed by this resin. However, in this case the interaction proceeds more slowly. For instance at room temperature, 5 grams of the resin II can sorb more than 90% of lindane (in a hundred ppm concentration) from 100 ml water solution in about 12 h of interaction-time. The rate of interaction depends also on the structure of the chlorinated benzenes such as BHC and chloranil. The reaction can be represented as shown in FIG. 3.

Obviously the capacity of the resin II depends on its degree of functionalization. The resin can be used in batch or column operations. Moreover the resin II is also a powerful complexing agent. It can bind various transition metal ions even at 0.1 ppm levels of concentration.

Recycling of the used resin.

The used resin can be regenerated by boiling with acid solutions. Evolved $CS_2$ or COS is trapped with alkaline solutions such as NaOH, KOH or $Ca(OH)_2$. In this way the resin turns into the acid salt. The resulting polysalt can be freed by interaction with NaOH solution. Then it can be functionalized by $CS_2$ as described above. Thus, 10 g of loaded resin is placed into a 250 ml volume two-necked flask which is attached to a reflux condenser. A rubber tube is attached at the top of condenser so that the second end of the tube is immersed in concentrated NaOH solution in a glass trap. Then 100 ml of 3 M $H_2SO_4$ solution is added to the flask through a dropping funnel. The content of the flask is heated gradually to the boiling temperature. Hydrolysis of dithiocarbamate ester is completed in about 20 min. Evolved $CS_2$ or COS is trapped by the concentrated NaOH solution. Then the content of the flask is filtered and washed with water. While wet, the product is transferred into 200 ml of 4 m NaOH solution in a beaker. The mixture is heated at 40–50° C. for 1 h. After cooling the mixture is filtered and washed with excess of water and dried.

In order to convert it into dithiocarbamate form the same procedure which is described above is followed. It is apparent that many variations may be made in these process conditions.

Thus, by this procedure a nonsoluble resin can be obtained from ethylenediamine (1,2 diamino ethane) and epichlorohydrin. It can be obtained in bead form by suspension polycondensations. This resin can be transformed into dithiocarbamate form by treating with $CS_2$/NaOH. This dithiocarbamate-containing resin does not have an unpleasant odor and is extremely reactive towards trace amounts of transition metal ions in water solutions. Regeneration of the used resin can be achieved by acid treatment, giving $CS_2$ or COS. During regeneration, evolving gases can be trapped in concentrated base solutions. Free amine resin is liberated by aqua NaOH solution. Dithiocarbamate functions can be inserted again by reacting with $CS_2$ and NaOH. Depending on the conditions, this resin can bind a wide variety of chlorinated compounds in between a few seconds and a few days. Aliphatic chlorides can generally be bound faster than aromatic ones. Reaction facility is associated with the structure of the chlorinated compounds to be removed.

1,2 Diaminoethane Containing Epoxy Resins for Separation of Aldehydes

In a form of the invention, epoxy-amine resin obtained by inverse suspension polycondensation of epichlorohydrin with ethylenediamine has been demonstrated to be very useful for selective separation of aldehydes from the mixtures. The 1,2-diaminoethane units in the crosslinked structure can be regarded as a polymeric analog of Wanzlick reagent, (1,2-dianilinoethane) which readily condenses with aldehydes to form five-membered cyclic structures, imidazolines. In the presence of mineral acids the imidazoline ring decomposes into its components. This reverse reaction serves as a means of regenerating the aldehydeloaded polymer. The method described below is especially suitable for extraction and recovery of aromatic aldehydes from organic mixtures, even in small quantities.

The method works also for aliphatic aldehydes. However in that case, aldol condensation products may form in the solution and the insoluble polymer may sorb these by-products together with aldehyde itself.

Aldehyde sorptions are rapid in water-miscible solvents such as dioxane and methanol, whereas in cyclohexane, aldehyde sorption is slow, due to hydrophilicity of the polymer.

More specifically, this aspect of the invention involves separation of aldehydes by using epoxy-amine resins having 1,2-diaminoethane unit in the main chain. Dianilinoethane (which is so called Wanzlick reagent) has been reported to form imidazolines with aldehydes [6]. This reaction has been reported to be reversible in acid conditions. Upon treating with dilute mineral acids, the imidazoline decomposes into its components. Applicant has discovered such a reaction in polymeric 1,2-diaminoethanes. However, this process is not straightforward, because during decomposition of the imidazoline group with acids, side reactions usually occur through phenyl rings. And these side reactions reduce the reactivity of dianilinoethane for the next reaction. Similarly, applicant has observed that the crosslinked polymer obtained by condensation of p-dichloromethyl benzene and ethylenediamine also binds aldehydes. However, after the first regeneration by concentrated acids (i.e. 1 M) the reactivity of the polymeric reagent lowers to one third of its original reactivity [7].

The change of the reactivity might be because of acid catalyzed hetero-condensation reaction (possibly Sommelet Rearrangement), through amino groups and phenyl rings.

In order to avoid this side reaction applicant sought a suitable polymer. It was found that the crosslinked epoxy-amine resin obtained by condensation of ethylenediamine with epichlorohydrin is suitable for aldehyde-uptake from mixtures. Not having aromatic groups, this polymer is found to reduce side reactions in the regeneration step. Aldehyde binding ability and regeneration conditions of the crosslinked epoxy-amine polymer for different aldehydes are discussed below.

Example of Aldehyde Uptake

Carbonyl-free methanol was prepared from commercial methanol (E.Merck) as described in the literature [8]. Benzaldehyde (E.Merck), acetaldehyde (E.Merck), salicylaldehyde (E. Merck) and butyraldehyde (BDH) were distilled before use. All the other chemicals used were analytical grade commercial products. They were used as supplied (epichlorohydrin: Fluka; ethylene diamine: E. Merck).

Preparation of the Epoxy-Amine Resin

Direct interaction of epichlorohydrin with ethylenediamine may cause violent explosions. An insoluble resin was prepared safely by suspension-polycondensation methodology, according to the procedure described above and elsewhere [8]. A 10% stoichiometric excess of epichlorohydrin was used to obtain a solid and water-insoluble product.

Determination of the Accessible Amine Content

Inevitably, some of the amino groups are embedded in the polymer matrix. Not all of the secondary amines are accessible and susceptible to aldehyde binding. In order to estimate the maximum capacity of the resin, 0.5 g of the resin sample was contacted with 20 Ml of 2 M HCl solution for 24 h. The mixture was filtered and 10 mL of filtrate was titrated conductometrically with 0.1 M NaOH solution in order to find the excess of the HCl used. From these data the accessible amine content was calculated as 15.1 mmol/g resin, which is 88.1% of the total theoretical amine function.

Aldehyde Loading Capacity of the Resin

To estimate aldehyde-binding capacities of the resin, 0.5 g of the resin sample was introduced into 25 mL alcohol solutions of 13.5 mmol aldehyde, which is about twofold excess of the theoretical capacity. The mixtures were stirred for 3 h at room temperature. At the end of this period the mixtures were filtered and 1 mL samples were taken from the filtrates and transferred quickly into volumetric flasks. The samples were diluted with carbonyl-free methanol up to appropriate concentrations ($\sim 10^{-5}$ M).

The aldehyde concentrations were determined calorimetrically according to the procedure based on 2,4-dinitrophenyl hydrazine method, yielding an absorbtion maxima around 480 nm [9]. The sorbed amounts were calculated by differentiating the initial and final aldehyde contents of the interacted solutions. The relevant data are shown in FIG. 6 (Table 1).

Aldehyde Sorption Kinetics of the Resin

Figure 7:
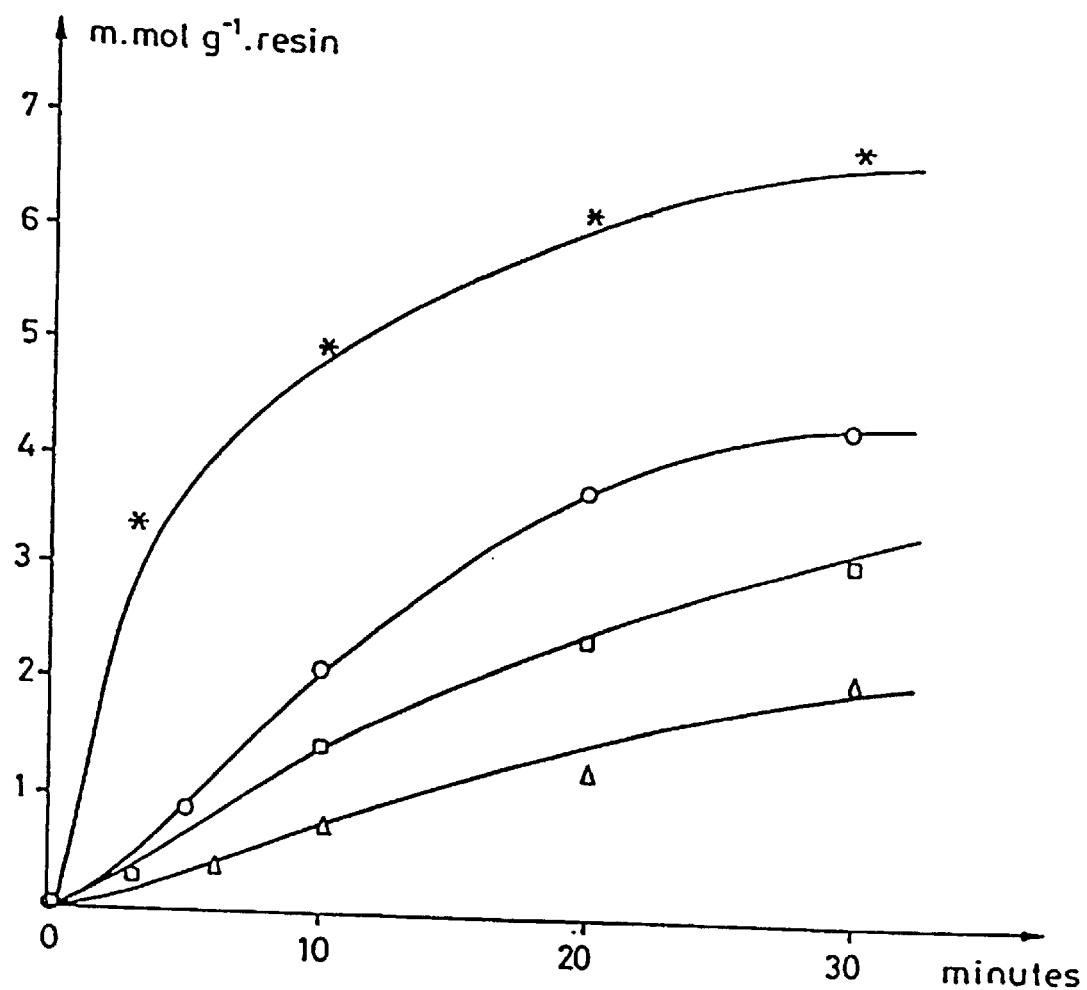
FIG. 7 shows sorption kinetics of various aldehydes by the resin. [Acetaldehyde (Δ), Benzaldehyde (□), Salicylaldehyde (○) and Butyraldehyde (*)]
Figure 8:
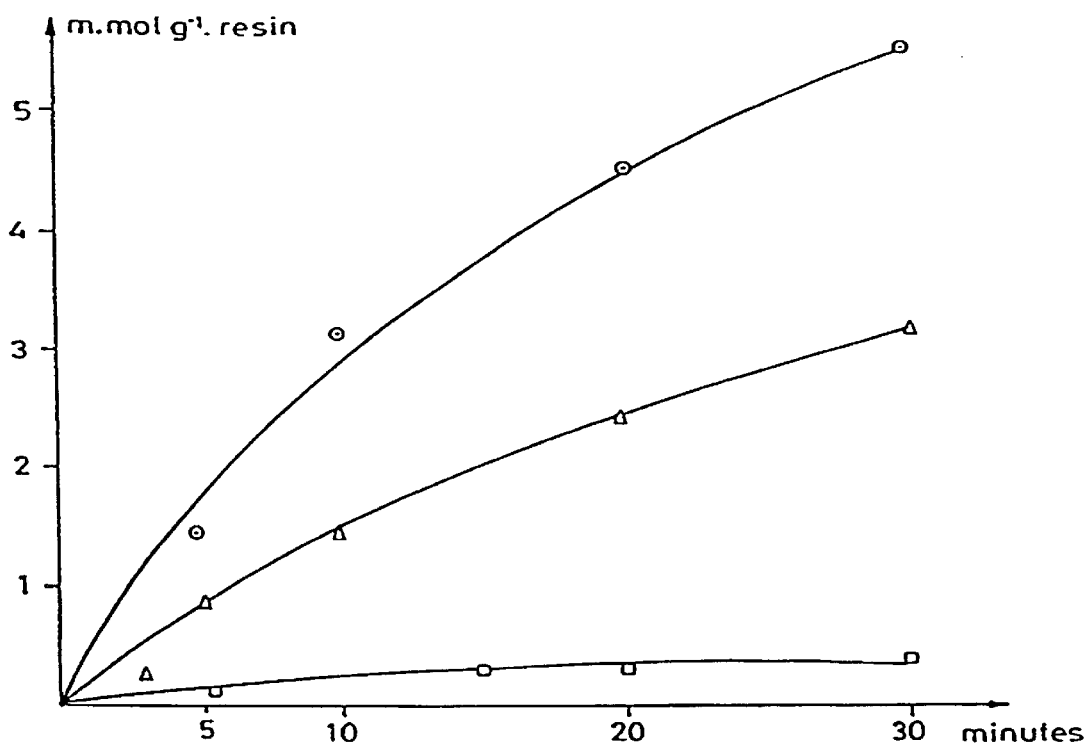
FIG. 8 shows sorption kinetics of benzaldehyde in methanol (Δ), in 1,4 dioxane (ø), in cyclohexane (□)

Simple batch kinetic experiments were performed as follows: To 50 mL of methanolic aldehyde solution $3 \cdot 10^{-2}$ M), 0.5 g of resin sample was added and the mixture was stirred gently. 2 mL of aliquots were taken from the mixture at appropriate time intervals. the sample solutions were transferred into volumetric flasks and diluted properly. Aldehyde concentrations were assayed calorimetrically. The sorbed amounts were calculated as described above. Time dependent aldehyde sorptions were depicted as shown in FIG. 7. The sorption of the aldehydes studied [benzaldehyde (*), salicyl aldehyde (○), butyraldehyde (□) and acetaldehyde (Δ)] obeys second order kinetics. By plotting $1/\beta$ versus time (where $\beta$ represents percentage of the unreacted aldehyde in solution) the rate constants were found from the slopes of the linear graphs. The results obtained have been collected in FIG. 6 (Table 1). To investigate the solvent effect, the sorption kinetics of benzaldehyde were studied using three different solvents: methanol (⊙), dioxane (Δ) and cyclohexane (□), under the same conditions. The comparative data are depicted in FIG. 8.

Stripping of the Aldehydes from the Loaded Resin

The desorption kinetics were studied by treating the aldehyde loaded samples (0.5 g) with a mixture of 25 mL methanol (carbonyl-free) and 25 mL of 2 M HCl solutions. Time dependent desorptions of benzaldehyde and butyraldehyde were followed by samples taken at appropriate time intervals. For stripping of the aldehydes completely, the same experiments were repeated by prolonged interaction periods (24 h) of the loaded samples with the acid solutions. The released aldehydes in the solutions were determined similarly.

Regeneration of the Used Resin

By treating with 1 M HCl solution only 43–67% of the sorbed aldehydes were released from the loaded samples. When, however, more concentrated (5 M) HCl solutions (25 mL per gram of the resin) were used, the resin samples became completely aldehyde-free in about 5 h. At the end of this procedure, the amino groups of the resin are in HCl form. In order to recovery of these samples, the washed samples were contacted with 25 mL of 2 M NaOH solutions. After washing with excess of water the regenerated samples were dried under vacuo at 40° C. for 24 h.

Results and Discussion

Figure 4:
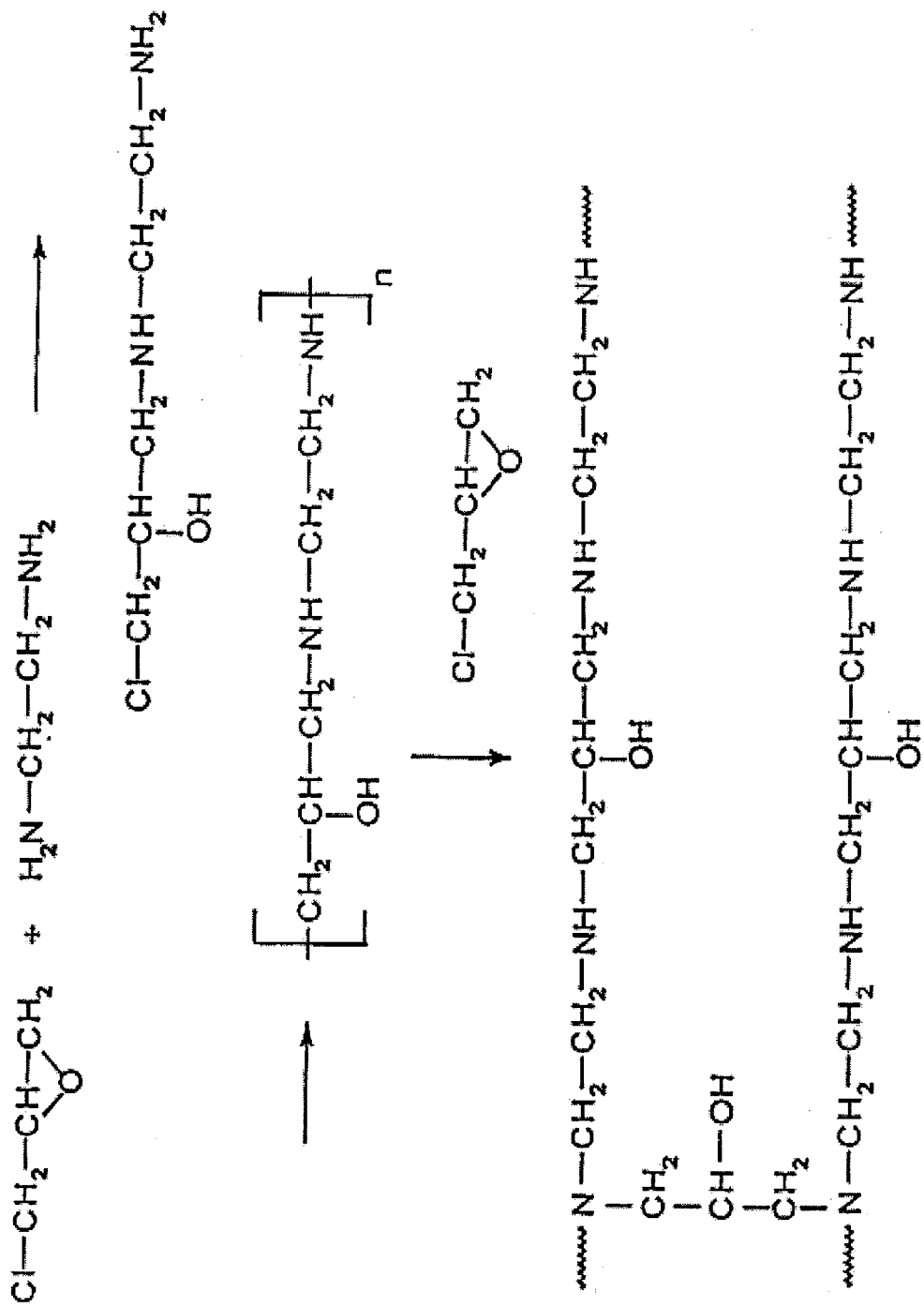
FIG. 4 illustrates the cross linking of the resin with excess eipchlorohydrin.

As noted above, an aspect of the present invention involves reversible aldehyde binding ability of crosslinked polymers with 1,2-diamino ethane units. In the example, the crosslinked insoluble polymer was obtained by condensation of the suspension of epichlorohydrin with ethylenediamine in cold liquid paraffin and its reversible aldehyde binding ability was tested. The structure of the insoluble polymer is believed to be as shown in FIG. 4.

The stoichiometric excess of epichlorohydrin is believed to act as crosslinking agent. According to this formula, the polymer does not contain primary amines, which seems unexpected for the condensation polymerization. In order to determine the primary amine content, a nitrous acid test was used, which is characteristic for primary amines. This method is known as the Van-Slyke method, which is used for quantitative determination of amino acids by measuring of the volume of the nitrogen gas evolved from primary amino groups [10].

Interestingly, no nitrogen evolution was observed by nitrous acid test. This result clearly indicates that the insoluble epoxy-amine resin contains practically no primary amino groups and the whole structure consists of secondary and tertiary amines as depicted in FIG. 4.

Since 10% excess of epichlorohydrin is used, the theoretical secondary amino content of the crosslinked polymer is calculated as 15.51 mmol. $g^{-1}$ resin. But in fact some of the amines are retained in the crosslinked structure and these are not accessible for chemical interactions. In order to estimate the accessible amine content a weighed amount of polymer sample was contacted with aqua solution of HCl (5 M) and the unreacted part of the HCl in the test solution was determined by back titration with 1 M NaOH solution. In this way the accessible amine content was calculated as 15.1 mmol/g resin. If we assume that secondary and tertiary amine distribution is equal in the accessible and inaccessible parts, 13.6 mmol of secondary amine must be accessible. Since two amino groups are consumed per aldehyde molecule, the effective aldehyde binding capacity of the polymer is expected to be 6.8 mmol/g.

Aldehyde Sorption by the Resin

Figure 5:
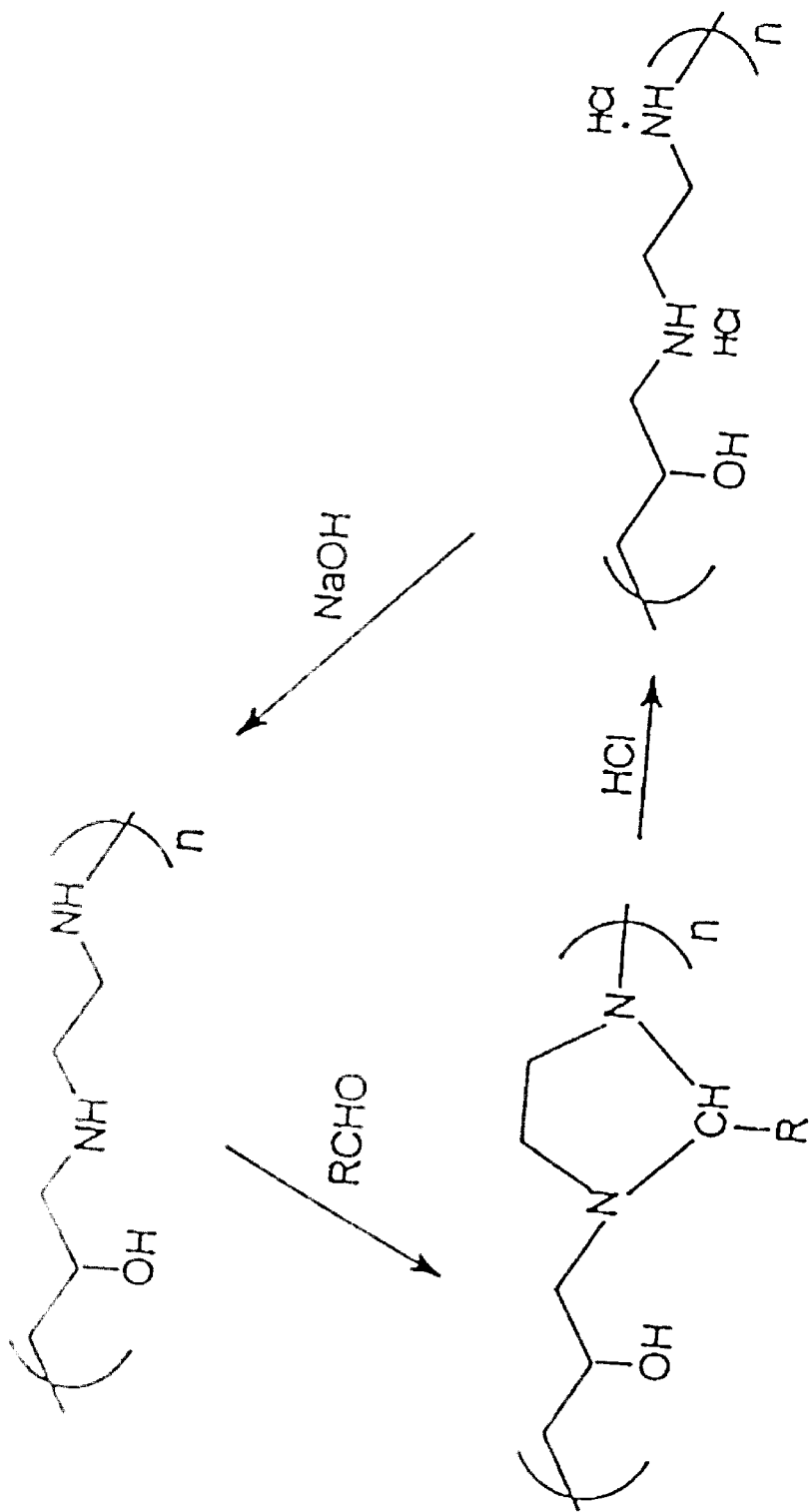
FIG. 5 is a suggested mechanism for reversible aldehyde binding and acid release by a resin according to the invention.

Based on the reversible aldehyde binding ability of dianilinoethane, aldehyde sorption of the polymer is believed to be represented as shown in FIG. 5.

The aldehyde sorption must proceed via imidazoline ring formation. To break up the imidazoline moiety, concentrated HCl solution is used, and the aldehyde sorbed is released from the polymer. This fact is the key point of the reversible aldehyde binding, which allows recovery of the sorbed aldehyde. After separation of the stripped aldehyde, the amino groups in the polymer are in HCl form. These are readily converted into free amine form by a simple base treatment (1 M NaOH) and the crosslinked polymer becomes regenerated and ready for the next use.

In order to show practical efficiency of the resinous product, the resin samples were contacted separately with twofold excess of aldehydes for 3 h at room temperature. The loading capacities under these conditions were found by determination of the residual aldehyde concentrations of the solutions as seen in FIG. 6 (Table 1). The data indicates that the loading capacity for butyraldehyde (6.6 mmol/g) is significantly higher than that for the other aldehydes.

Having low molecular weight, acetaldehyde would be expected to show higher binding ability. However, under some conditions, the resin itself acts as base catalyst for aldol type of condensation of acetaldehyde and the solution becomes red-brown on standing more than 4 hours. This creates complications in determining the aldehyde concentration. Aldol condensation is known as a typical reaction of aliphatic aldehydes possessing α-hydrogen. Indeed the colored solution exhibits the characteristic odor of crotonaldehyde, which is the first condensation product of acetaldehyde.

During the sorption of acetaldehyde, the resin also becomes colored. This can be ascribed to a fast aldol condensation of acetaldehyde and sorption of aldol products together with the acetaldehyde itself by the resin. Absorbtion maxima of the aldol products shifts to longer wavelengths due to increasing conjugation with time. This conjugation causes observation of high absorbtion around 480 nm for the residual acetaldehyde in the solution. As a result the sorbed amounts observed for the acetaldehyde are misleadingly lower than for the other aldehydes.

Due to this fact the sorbed amount has lower than expected observed values. The same argument is valid also for the sorption kinetics: the observed kinetic curve of acetaldehyde lies under those of the other aldehydes.

In order to compare the aldolization behavior of butyraldehyde, it was left in contact with the resin for 4 h in methanol solution. The shift in its absorbtion maxima (323 nm) was only 30 nm which is far below 480 nm of wavelength. So aldol condensation for butyraldehyde proceeds slowly and does not cause significant complications in 3 h of interactions in the loading experiments studied.

Figure 9:
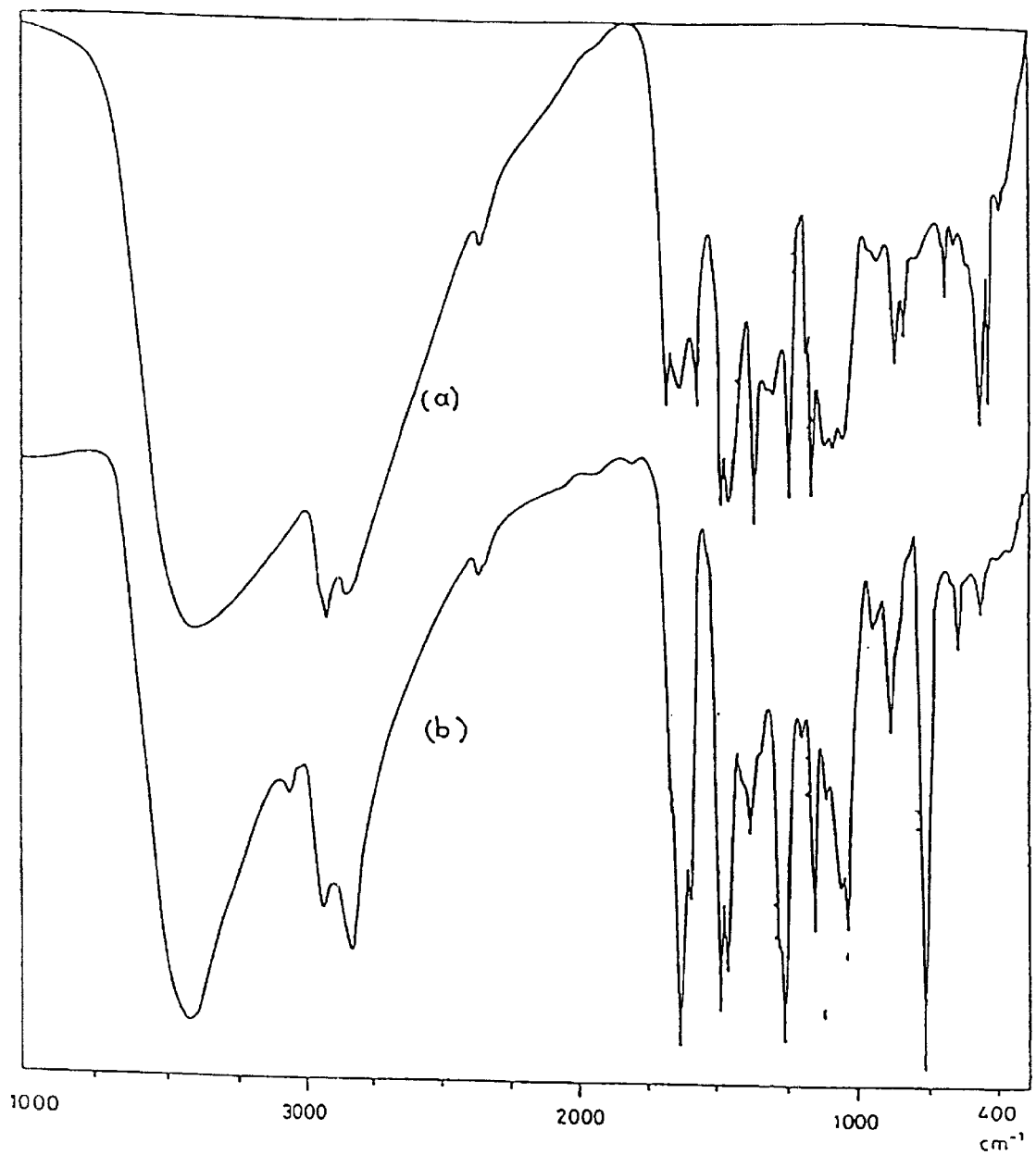
FIG. 9 shows FT-IR spectra of the resin (a), and the resin loaded with benzaldehyde (b)

In comparison to benzaldehyde, salicylaldehyde binding is higher and faster than the former. Most probably the acidic character of the phenolic OH group in salicylaldehyde is responsible for its high uptake, due to basicity of the resin itself. Aldehyde binding can be analyzed by the FT-IR spectra of the benzaldehyde loaded polymer. Aromatic C—H stretching vibrations of the phenyl ring is clearly observed at 3050 and 3080 $cm^{-1}$. These vibrations are not observed for the original polymer because of its all-aliphatic structure. This evidence is a clear-cut demonstration of the incorporation of benzaldehyde into the structure (FIG. 9).

Sorptions of aldehydes obey second order kinetics. Rate constants for all the aldehydes (except acetaldehyde) are in the $1.5 \times 10^{-2} – 2.0 \times 10^{-2}$ $mol^{-1}$ $s^{-1}$ range.

From the kinetic curves in FIG. 7, it is clearly seen that the sorption rates are in butyraldehyde>salicylaldehyde>benzaldehyde>acetaldehyde order. It is interesting to note that aldehyde sorption is drastically lower in cyclohexane than in methanol and dioxane solvents (FIG. 8). This seems to be in accordance with the polarity of the solvent used, because the resin itself is hydrophilic and is not compatible with hydrocarbon solvents, such as cyclohexane. As discussed below and elsewhere, oligoethyleneimines attached to polystyrene sulphonamide resin are capable of aldehyde uptake from both hydrocarbon and polar solvents [11]. In that case the hydrophile-lipophile balance of the polymer-structure permits interaction with polar and nonpolar solvents. As a consequence, hydrophile-lipophile balance is an important factor governing aldehyde sorption, as found in metal-uptake experiments on some polymers before [12].

In the present case the polymer is hydrophilic in nature and sorption occurs preferably in polar solvents.

Recovery of the Sorbed Aldehydes and Regeneration of the Resin Polymer

Aldehydes were stripped from the loaded polymer samples by interacting with a mixture of methanol/HCl (2 M) solution (1:1). The amounts of stripped aldehydes were measured by monitoring aldehyde concentrations of the acid solutions. These experiments show that aldehyde desorptions are not complete in 3 h of interaction period and 43–67% of the sorbed amounts are eluted. See FIG. 6 (Table 1).

High swelling ability of the resin in the acid may be another factor affecting the desorption, because diffusion of the released aldehydes from the swollen polymer matrix into the solution may be inhibited. The swelling ratio of the polymer in 1 M HCl solution is about 16.0 ($W/W_o$), which can be considered to be responsible for the slow desorptions.

However, additional experiments indicate that within 5 h of interaction with 5 M HCl solutions, all the sorbed aldehydes are released completely from the loaded polymer samples.

Figure 10:
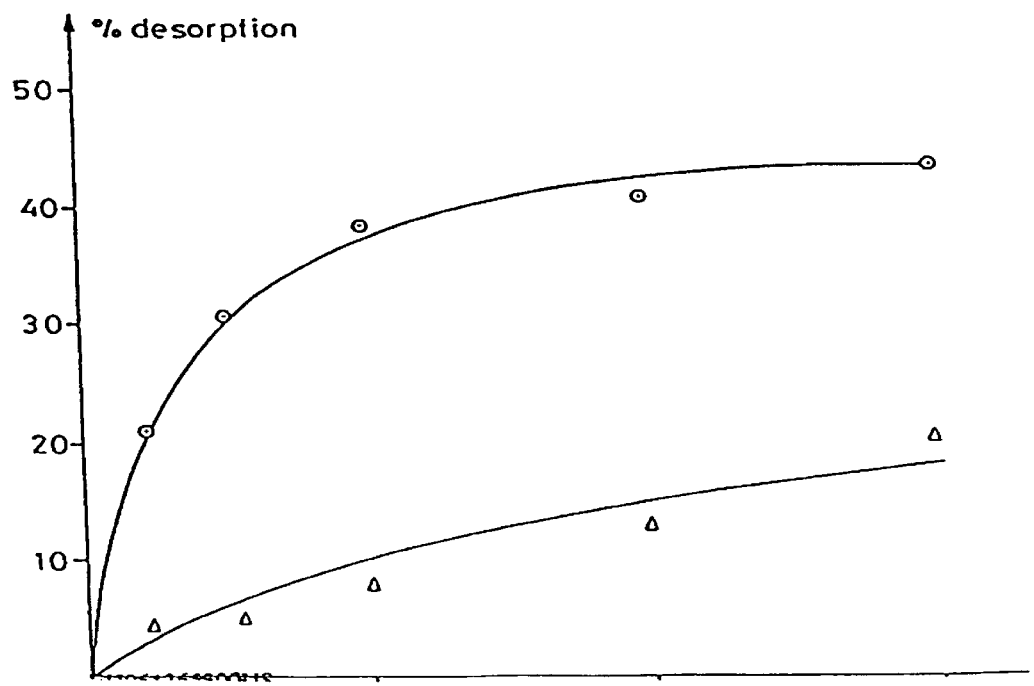
FIG. 10 shows percentage aldehyde releasing from the resin in methanol/2 M HCl (1:1) solution; [Butyraldehyde (◉) benzaldehyde (Δ)]

Additionally, to compare the desorption rates of aromatic and aliphatic aldehydes, desorptions of benzaldehyde (Δ) and butyraldehyde (○), were followed kinetically. FIG. 10 represents that the desorption of butyraldehyde is faster than that of benzaldehyde, probably because of the higher hydrophilicity of the former. Relatively higher hydrophilicity facilities the diffusion of acid solution into the loaded polymer and this results in faster desorption of butyraldehyde.

The last step is regeneration of the used polymer. After a complete desorption of the aldehydes, the amino groups are in HCl form. The polymer at this stage can readily be transformed into free-amine form, simply by contacting it with 1 M NaOH solution for 24 h. After washing with excess water and drying, the polymer becomes regenerated and is essentially ready for use in the next cycle. Indeed, comparison of the IR spectra of the original polymers with those of the regenerated one reveals that the two samples have the same IR pattern.

Interferences in the Aldehyde Sorption

A qualitative test with acetone indicates that acetone was bound to the polymer when contacted for 5 days. Also, in acetic acid, aldehyde sorption was not observed due to inhibition of the nucleophilicity of the secondary amino groups. Also alkyl halogenides are to be considered as efficient interfering agents due to their alkylating effects on the secondary amines.

In conclusion, 1,2-diaminoethane units in the epoxy-amine resin described can be used to extract aldehydes from relatively polar solvents or mixtures. Recovery of aromatic aldehydes is quite possible. Aliphatic aldehydes, except acetaldehyde, can also be recovered provided that the interaction period is less than 3 h. In the case of long term interactions with aliphatic aldehydes with a-hydrogen, aldol condensation (Claisen-Schmidt) products form during the sorption. This can be considered a limitation of the polymer in using it for recovering aliphatic aldehydes. However if the recovery of aldehyde is not aimed at, the polymer can be used for the removal of trace quantities of aliphatic aldehydes.

Moreover, not having hydrolysable groups, the polymer is quite stable towards acid and base hydrolyses. This is another important factor favoring recycling of the polymer, especially in practical applications. Further, this seems to be general for 1,2-diamino ethanes and can be extended to many other polymers having 1,2-diamino ethane units in the main or side chains. Finally, this crosslinked polymer can be synthesized from commercially available chemicals and the method presented is very promising for large scale applications.

Removal of Transition Metal Cations and Their Counteranions by Crosslinked Epoxy-Amine Polymer As noted above, reaction of epichlorohydrin with ethylene diamine is very exothermic and severe explosions occur even when few milliliters of the reagents are interacted without solvent. A controlled reaction has been achieved safely by suspension polycondensation of epichlorohydrin with ethylenediamine. In another aspect of the invention, the 1,2 diamino ethane units in the resulting crosslinked polymer present high chelating ability for transition metal ions, i.e. Cu(II), Ni(II), Co(II), Cd(II), Fe(III), Cr(III). Having all-amine ligating groups, the polymer represents unique properties in that it can sorb not only metal cations but also their counteranions, such as chloride, sulphate, nitrate and acetate. The crosslinked polymer is stable hydrolytically and regenerable by acid without losing its activity. It can be recycled and offers a means of simultaneous removal of cations and anions from aqua solutions.

As noted above and elsewhere, a resinous polymer obtained by condensation of p-dichloromethyl benzene with ethylenediamine is capable of binding transition metal ions together with their counteranions [22]. However, after regeneration with concentrated HCl solutions the polymer looses its original activity due to acid-catalyzed side reactions, probably Sommelet Rearrangement, through phenyl rings [23].

In order to overcome this drawback, the present invention involves a crosslinked aliphatic polyamine prepared by condensing epichlorohydrin with ethylenediamine. Preparation and metal complexes of some related materials have been described in some patent literature [24]. But its anion binding character has not been fully recognized so far. Preparation, metal uptake from aqua solutions and anions binding ability (with chloride, sulphate, acetate and nitrate anions) of the resulting polymer have been investigated by the applicant and are described below.

All the chemicals were analytical grade chemical products; Ethylenediamine (E. Merck), epichlorohydrin (Fluka), metal salts (E. Merck). They were used without significant further purification.

Preparation of the crosslinked polymer:

50 ml of liquid paraffin was placed in a 250 ml volume two-necked flask equipped with a reflux condenser and a dropping funnel. The whole system was immersed in an ice both. Next, 10 ml (0.15 mol) ethylenediamine and 15 ml 1-methyl-2-pyrrolidone were added to the flask. While stirring with a magnetic stirring bar (350–400 rpm), 12.9 ml (0.165 mol) epichlorohydrin was added cautiously to the mixture through a dropping funnel. A white flocculent occurred after stirring for 45 minutes. Stirring was continued for another 18 h at room temperature. Then the mixture was heated to 70° C. for 3 h. The solid which precipitated was filtered and washed with 30 ml toluene. The product was dispersed in 30 ml toluene and refluxed for 30 min. to remove paraffin residues, filtered, and washed with ethanol and water. The product was transferred into 50 ml 5% NaOH solution and stirred for 2 h. to obtain HCl-free resin. After filtration, the white-yellow product was washed with excess of water and 20 ml of ethanol, dried at 80° C. for 24 h under vacuo. The yield was 15.7 g (86.0%).

Determination of Accessible Amine Content:

Accessible amine content was determined according to the procedure described above and elsewhere [22]. For this purpose, 0.5 g of the resin sample was soaked into 20 ml of 1 M HCl solution and left in contact overnight, while stirring in a closed bottle. The excess of unreacted acid was titrated with 0.1 M NaOH solution in the presence of phenolphthalein as indicator. The accessible amine content was calculated as 11.4 mmol $NH_2$/g resin.

Swelling of the Resin Sample:

Disc shaped samples with a diameter of 1 cm and 2.3 mm thickness were prepared from 0.25 g dry polymer, by an IR pellet sampler under 10 tons/cm² of pressure. Each disc was placed in a 100 ml volume sintered glass funnel, in a closed bottle containing 150 ml of tampone (buffer) solution (pH: 2.0 and 5.5). The level of the tampone solutions were adjusted so that the upper level was 5 cm higher than that of the sample. The bottles were sealed to prevent any $CO_2$ uptake which might cause shifts in pH.

Figure 14:
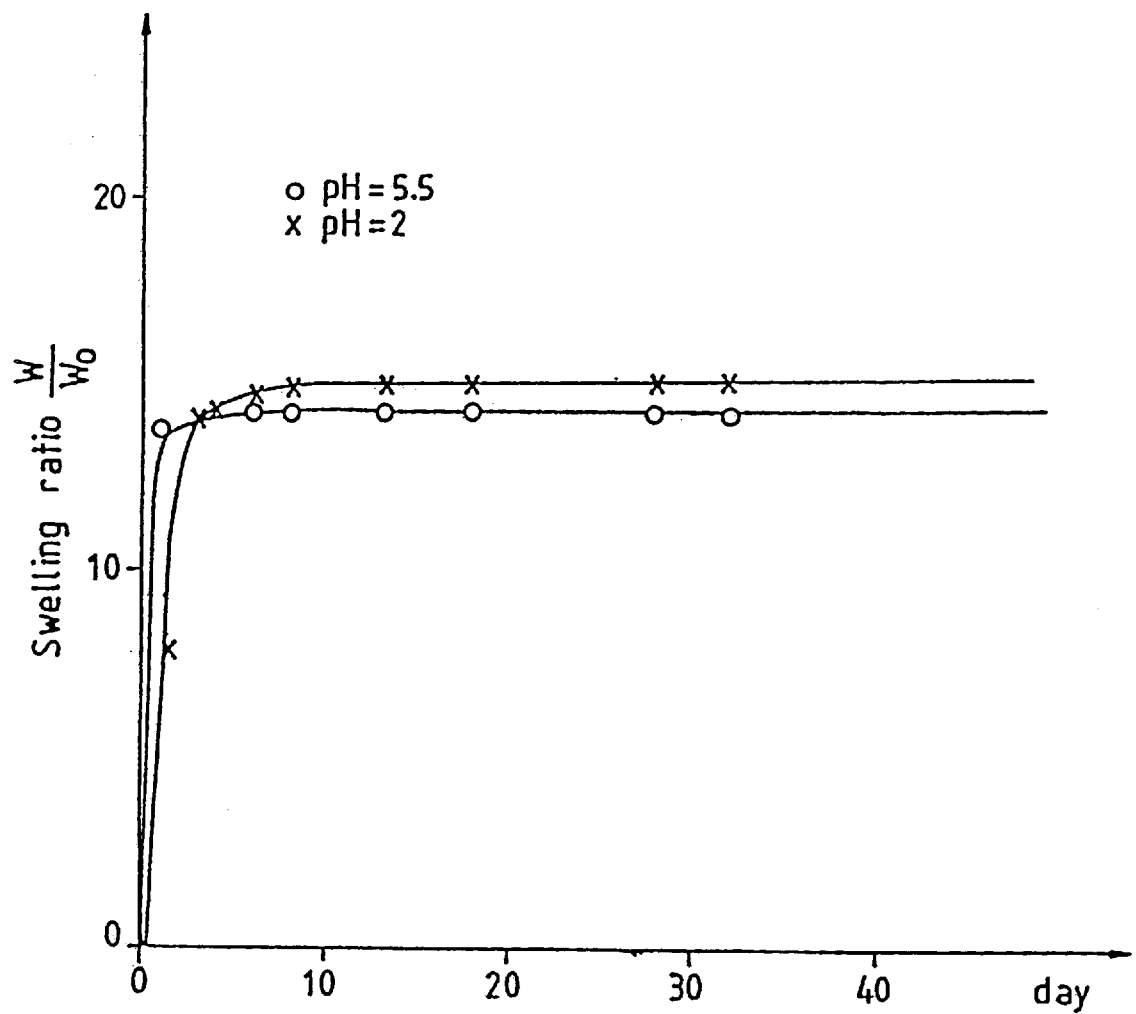
FIG. 14 shows the variation of the swelling ratio of a crosslinked polymer of the invention in different pH's.

The samples were allowed to stand in contact with the tampone solutions for 6 weeks at room temperature. From time to time the glass funnels were taken out, filtered by suction and weighed. The swelling ratios ($w/w_0$) found were recorded as a function of time (FIG. 14).

Determination of Metal Loading Capacities:

To estimate maximal metal-sorption capacities, 0.5 g of the polymer samples were contacted separately with 50 ml of tampone buffer solution (pH=4.3) containing 10.0 mmol of the metal salts ($CuCl_2.2H_2O$, $CoCl_2.6H_2O$, $Cd(NO_3)_2.4H_2O$, $NiCl_2.6H_2O$, $Cr(NO_3)_3.9H_2O$, $FeCl_3.6H_2O$), which is a 2.50-fold excess of the theoretical capacity. The mixtures were stirred for 30 min., filtered and washed with distilled water. The filtrates and washings were combined and made up to the levels of 250 ml in volumetric flasks. Metal ion contents of these solutions were assayed by Atomic Absorption Spectroscopy. On differentiation of the metal contents, between starting and interacted solutions, the amounts of sorbed metal ions were calculated and tabulated as shown in FIG. 11 (Table 2).

Determination of the Anion-binding Capacities:

Anion-binding capacities of the crosslinked polymer were determined by direct interaction of the metal salts. In these experiments tampone solutions were deliberately not used to avoid any possible interference coming from the components of the tampone. $Cd(NO_3)_2.4H_2O$, $CuCl_2.2H_2O$, $NiSO_4.6H_2O$ and $Cd(CH_3COO)_2.4H_2O$ were used as nitrate, chloride, sulphate and acetate anion sources. Non-sorbed anion concentrations of the interacted solutions were determined by classical analytical procedures. Sorbed amounts were calculated in similar fashion. Chloride ion was determined gravimetrically as AgCl by addition of 0.1 M $AgNO_3$ solution in presence of 0.5 ml conc. $HNO_3$. Sulphate ion was determined gravimetrically by precipitation as $BaSO_4$. For determination of nitrate and acetate, Cd(II) was first precipitated as cadmium sulphide by bubbling $H_2S$, through the dilute solutions. The filtered solutions were refluxed to remove trace of $H_2S$, then the resulting $HNO_3$ and $CH_3COOH$ were determined by conductometric titrations with 0.1 M NaOH solution.

Figure 15:
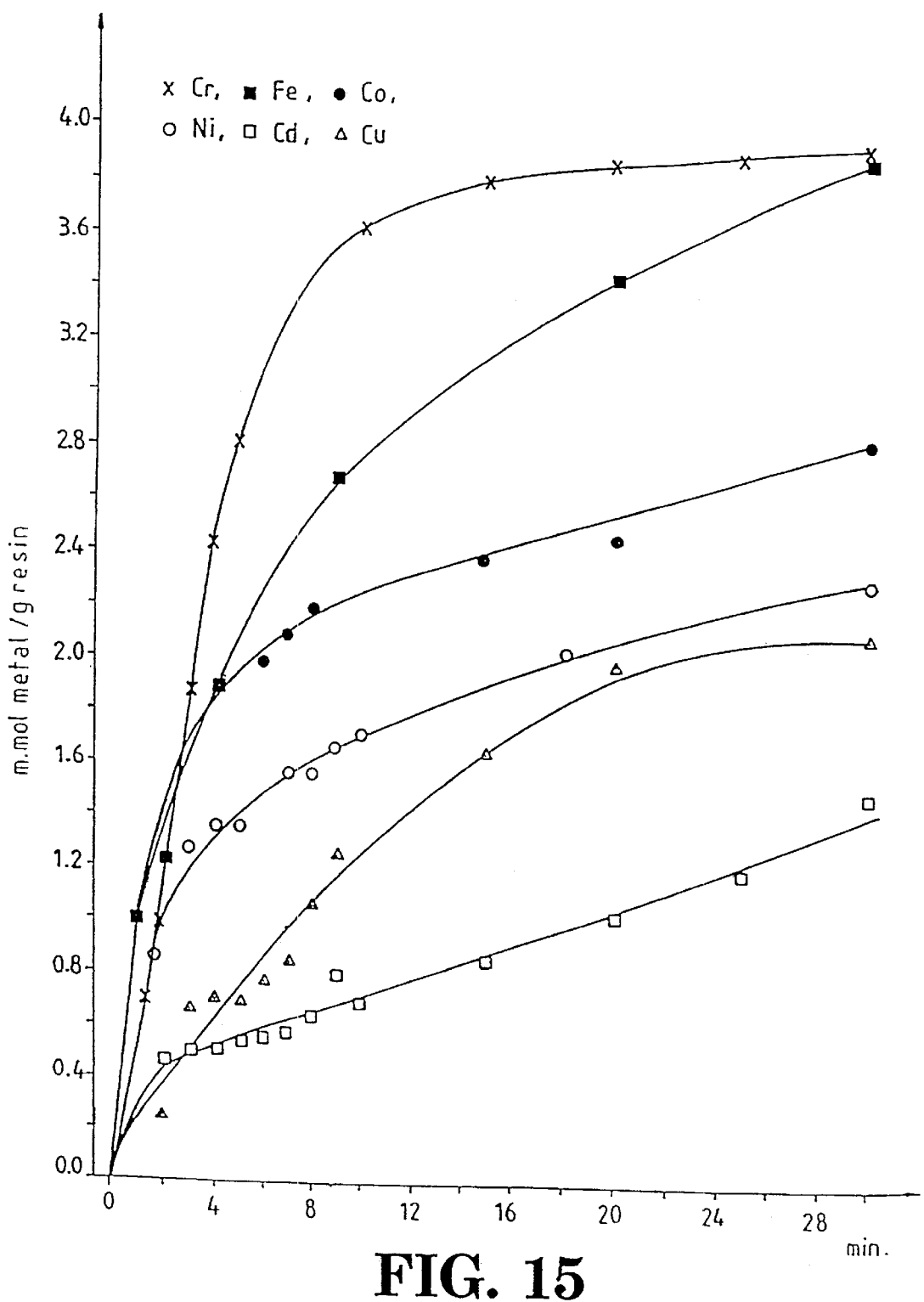
FIG. 15 illustrates metal-uptake kinetics of the resin at pH=4.3.

Metal-uptake Kinetics:

Simple batch kinetic experiments for metal sorptions were performed as follows: a 0.5 g sample of the crosslinked polymer was soaked into a 50 ml solution of one of the metal salts, which were prepared previously by mixing 25 ml tampone buffer solution [acetic acidsodium acetate, (pH=4.3)] with 25 ml of metal ion solutions in 0.024 M concentrations. Aliquots (1.0 ml) of the solutions were taken at appropriate time intervals while stirring and transferred into volumetric flasks through filter papers. The filtrates and washings were combined and made up to 50 ml. Metal contents were assayed by Atomic Absorbtion Spectroscopy. The relevant data for different metal ions are shown in FIG. 15.

The pH Dependence of Metal Sorbtions:

Then, pH dependent metal-sorbtions were performed by interacting 0.5 g polymer samples with the metal ion solutions (2.0 mmol metal ion in 50 ml of each tampone buffer solution). The mixtures were stirred for 30 min. at room temperature. The pH's of the tampone buffer solutions (sodium citrate-HCl or sodium acetate-acetic acid) were 1.00, 1.70, 2.40, 3.60, 4.30.

The pH values were chosen below 5.0 to avoid any metal hydroxide precipitation. Small fluctuations were observed in pH values during the experiments. For this reason, the referenced pH values were taken at the end of each experiment.

Figure 16:
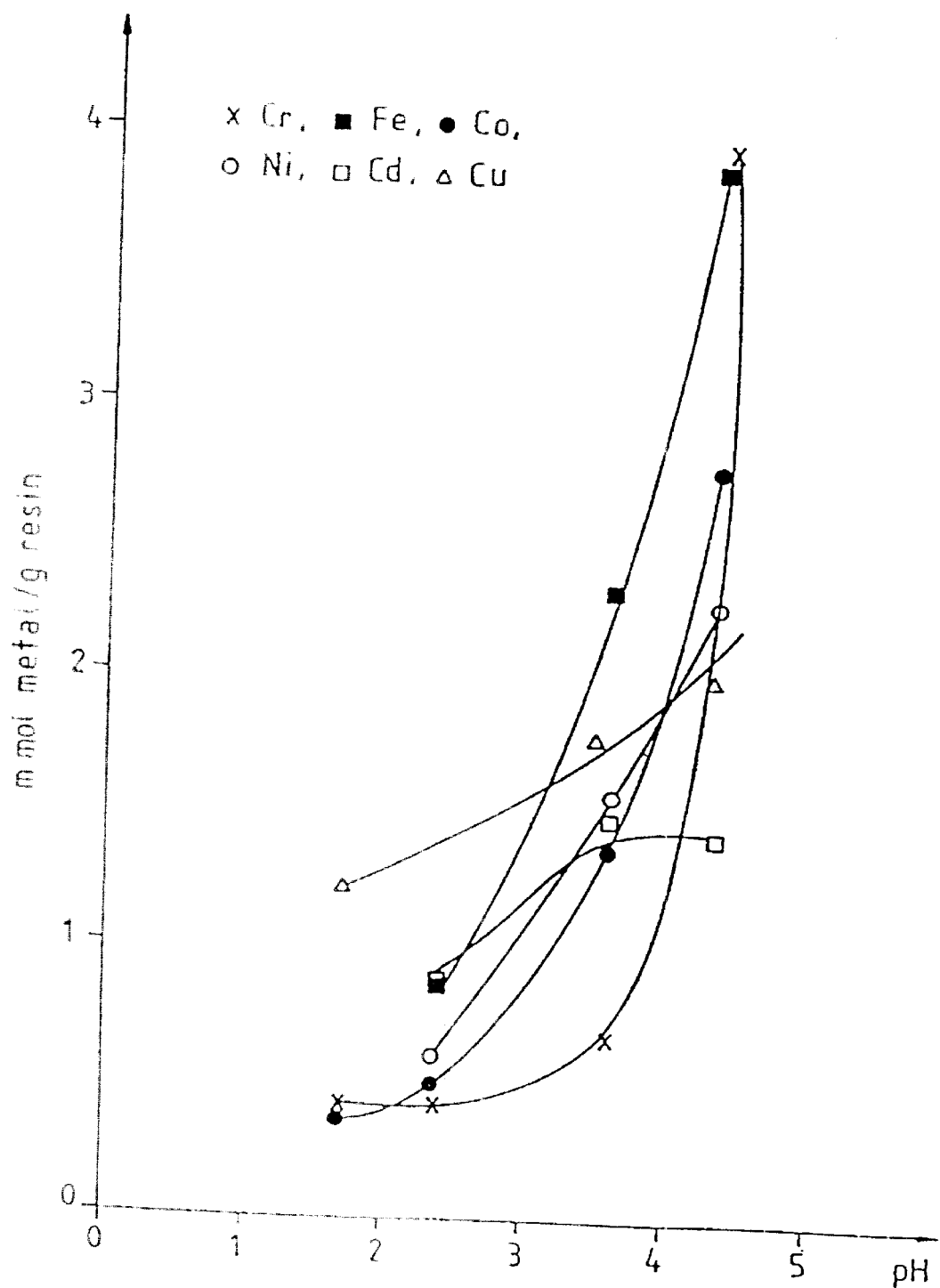
FIG. 16 shows pH dependence of the metal sorptions of the resin.

Unreacted metal ion contents of the used solutions were found by determination of the metal ion concentrations of the diluted solutions of the 1.0 ml aliquots. The sorbed amounts were calculated similarly. The sorbed amounts per gram resin were plotted as a function of pH, as shown in FIG. 16.

Recovery of the Metal Ions from the Loaded Samples:

Metal ions were recovered by decomplexation of the metal ions from the loaded samples by treating with 50 ml 1 M HCl for 30 min. After filtering, concentrations of the stripped metal ions were determined by AAS. For comparison, the stripped and sorbed metal contents of the same samples are listed in FIG. 11 (Table 2).

Regeneration of the Crosslinked Polymer:

After first treatment with HCl solutions, metal sorbed polymer samples remain colored which means the decomplexations have not been completed. For this reason, the acid treatment processes were repeated three times at least. Then, to obtain the polymer samples in free-amine form, they were treated with 50 ml of 2 M NaOH solutions. The filtered samples were washed with excess distilled water and 20 ml of ethanol. The resulting regenerated polymer is in free-amine form and ready for use in the next cycle.

Results and Discussion

Again, violent explosions can occur when contacting small amounts of epichlorohydrin with ethylenediamine, especially when used without solvent. The reaction is believed to proceed in two steps, i) ring opening of the epoxide group
ii) condensation of amine with the halogenide group.
Obviously the first step is fast and responsible for the explosions.

The present invention takes advantage of the fact that this drawback can be overcome by using liquid paraffin or toluene as dispersing phase. The ring opening step can be performed safely by a careful addition of epichlorohydrin to the mixture of ethylenediamine, N-methyl-2-pyrrolidone and liquid paraffin at 0° C. At the end of the heating step a crosslinked resinous polymer is obtained as particles. The particles tend not to be spherical.

Nitrous acid tests indicate that the product contains practically no primary amine groups and the whole structure consists essentially of secondary amine segments. There is a characteristic test for aliphatic primary amines that amines turn rapidly into alcohols with a simultaneous nitrogen evolution. This method is referred to as the Van-Slyke Method which is being used for quantitative analysis of amino acids [25]. In a recent paper, it has been pointed out that, secondary amines are less reactive than primary amines in the ring opening of epoxides [26]. This report is in accordance with the above result.

In the IR spectra (with KBr disc) of the polymer, N—H stretching vibrations which are expected to appear in 3200–3400 cm$^{-1}$ range are not distinguished clearly, due to superposition of the broad O—H stretching bands at the same frequencies. But the band observed at 1580 cm$^{-1}$ can be attributed to N—H plane bending vibrations.

Swelling characteristics of the polymer have similarities to those of polyelectrolyte gels. Being a cationic hydrogel, in acid conditions polymer segments tend to expand due to increasing ionization. This factor is important, and affects the rate of regeneration. This is because, during the regeneration by acid treatment, expansion of the polymer segments may provide a fast decomplexation. But diffusion of the desorbing metal ions from the swollen structure becomes difficult. For this reason the polymers whose swelling rates do not change so much in different pH's are preferred, to conduct the regenerations at reliable rates. In this example, the percentage difference of the swelling ratios in pH:2 and pH:5.5 is about 6% (See FIG. 14), a small difference.

Metal Sorbtion Characteristics:

Not all amino groups in the crosslinked polymer participate in complexing with metal ions. Inevitably, some portion of amines remains unreacted. To represent intrinsic activity of the polymer we have introduced a new quantity, "accessible amine content". This can be found by treating the polymer sample with excess HCl solution and back-titration of the excess acid with NaOH solution.

In this example, accessible amine content was found to be 11.4 (mmol/g dry resin). This corresponds to 67.7% of the theoretical amine content. See FIG. 12 (Table 2). Under ideal conditions, four or six amino groups may coordinate with one metal ion, to give planar, tetrahedral or octahedral complexes; with the ligands in crosslinked polymers, to attain such high coordinations is quite difficult due to restriction of the chain flexibilities. In the present case, for a true coordination, at least two amino groups must coordinate with one metal ion, because, once a metal ion attaches to one of the amino group, the neighboring amino group in 1,2 diaminoethane unit also gets involved in coordination due to formation of stable five-membered chelate.

Figure 13A:
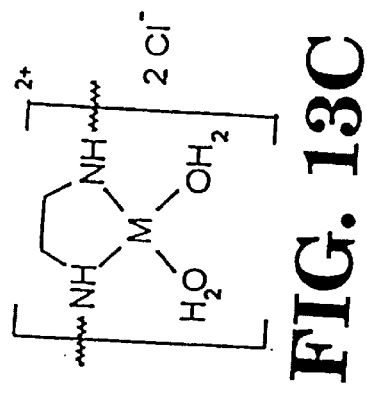
FIGS. 13A–13E shows possible types of metal complexing in ethyleneimine polymers, with A, C, and E most plausible.
Figure 13B:
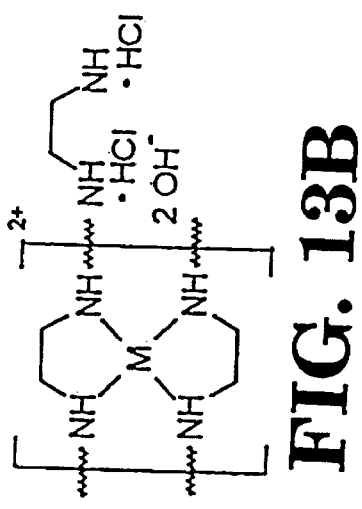
Figure 13C:
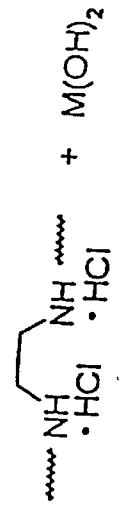
Figure 13D:
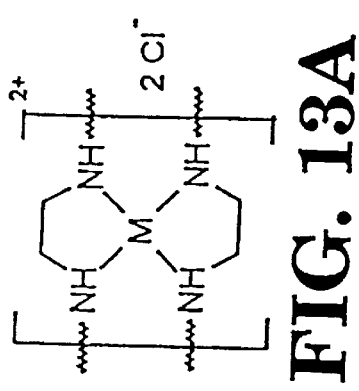
Figure 13E:
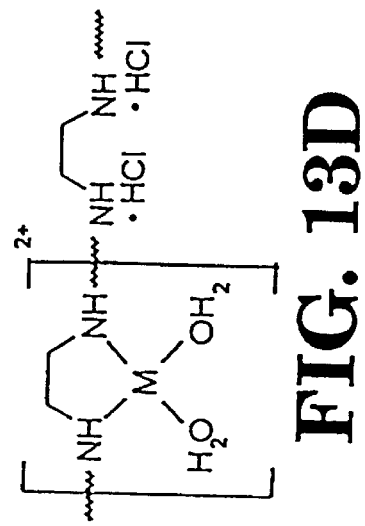

Maximum loading experiments show in FIG. 11 (Table 2) indicates that, (accessible amine content)/(metal ion) ratios are about 2:1 for Fe(III) and CR(III) ions and 3.5–4 for Cu(II), Ni(II) and Co(II) ions. This result generally establishes the above principle. As a consequence, formation of tris chelates is prohibited by sterical factors and the most plausible types of metal complexation must be those of FIGS. 13A, 13C, or 13E.

But the situation still remains quite complicated, due to different behavior of metal ions. For instance Fe(III) and Cr(III) precipitate as $Fe(OH)_3$ and $Cr(OH)_3$ respectively, in the presence of ethylenediamine in water. So interaction with Fe(III) may run in accordance with FIG. 13E. But in case for Cu(II) both types of interaction are possible because, with ethylenediamine, Cu(II) forms both free $Cu(OH)_2$ and chelated $Cu(en)(OH)_2$ depending on concentration of ethylenediamine. So chelation of Cu(II) with the polymeric ligand may be as in FIGS. 13B or 13E. In general metal uptake occurs by chelate formation or precipitation of metal hydroxides on the surface of polymer particles.

Kinetic experiments indicate that metal sorbtions are reasonably fast and equilibria establish within 30–35 min. at pH=4.3 (FIG. 15).

Regarding pH dependent metal sorbtions (FIG. 16), it can be deduced that it is not practical to separate any metal ion from the mixtures selectively. Further, the amounts of sorbed metal ions increase with increasing pH.

Anion Binding Ability of the Polymer:

A very important feature of the polymer of the present invention is its anion binding ability. This might be thought of as analogous to the complexing behavior of monomeric ethylenediamine. By a series of experiments we have clearly demonstrated that $Cl^-$, $SO^{-2}_4$, $NO^-_3$ anions are bonded to the polymer at high levels, as shown in FIG. 12 (Table 3).

These experiments were deliberately carried out without using tampone buffer solutions to avoid probable interference arising from the tampone components, because the anions of the tampone may be competitive in the sorption of other anions.

In a comparison of the sorbed anion contents with accompanying metal cations, their ratios are almost the same as in their free salts (for the anions studied).

Recovery of the Metal Ions and Regeneration of the Polymer:

The metal ions were eluted and recovered by leaching with 1 M HCl solutions. This process provides decomplexation of the metal ions sorbed. With the exception of Cd(II) decomplexations are visually followed by disappearance of their characteristic colors, while the aqua solutions become colored. However, at 30 min. it was observed that polymer particles remain colored, which means the decomplexation process was not complete. Indeed the metal contents of the resulting acid solutions are 10–40% of the sorbed amounts. To speed up the decomplexations more concentrated acid (5 M) solutions were used. However, the effect was reversed in the case of Fe(III) and Cr(III) ions. This can be ascribed to an anionic complex-forming ability of Cr(III) ions which can be bound to minimum cations as complex salts [27]. We found that a suitable way of desorbtion is to repeat the leaching by acids in moderate concentrations (1 M).

Conclusion:

The crosslinked polymer presented has high metal-uptake abilities. Being an all amine-ligating polymer, it sorbs metal ions by forming cationic complexes which carry counter anions for $CuCl_2$, $Cd(NO_3)_2$, $Cd(CH_3COO)_2$ and $NiSO_4$ salts.

Being also an anion binder, this polymer provides a means of a complete removal of some transition metal salts from aqua solutions. Hydrophilicity of the structure does not change during complexation due to formation of charged metal complexes and this results in high metal-uptakes.

The used polymer was recycled several times and retained full activity. Hydrolytical stability of simple aliphatic amines implies that the polymer can be recycled many times without loosing its original activity.

As a consequence, due to its anion binding ability this material is superior to classical ion exchangers and should prove very useful for water purification.

REMOVAL OF NITRITE IONS FROM AQUA SOLUTIONS

A further aspect of the invention involves a polymeric sorbent which is especially useful for nitrite ions separations. An epoxy-amine resin obtained by suspension polycondensation of ethylenediamine with epichlorohydrin contains practically no primary amino groups, essentially only secondary amino groups. The hydrochloride form of the resin is extremely efficient and highly selective in removal of nitrite ions from aqua solutions, even at very low concentrations. Nitrite binding occurs through formation of N-nitroso groups. The nitrite-loaded resin can be regenerated by concentrated acid solutions, without losing its reactivity.

An aspect of the present invention is to remove nitrite ions from aqua solutions by using crosslinked polymers possessing mostly secondary amine groups. For this purpose a suitable polymer should be regenerable. It was found that an insoluble polymer obtained by reaction of ethylenediamine with epichlorohydrin contain practically no primary amino groups and meets the above requirements. The use of the epoxy-amine polymer and its nitrite sorption kinetics have been investigated. Desorption of nitrite ions from the loaded polymer and regeneration conditions have been studied.

Example

All the chemicals were analytical grade chemical products: Ethylenediamine (Merck), epichlorohydrin (Fluka), $NaNO_2$ (Merck), Trisodium citrate (Merck). The 2,7-dihydroxy napthalene (Merck) was crystallized from alcohol before use.

Preparation of the Crosslinked Polymer:

First, 50 ml of liquid paraffin was placed in a 250 ml volume two-necked flask equipped with a reflux condenser and a dropping funnel. The whole system was immersed in an ice bath. 10 ml (0.15 mol) ethylenediamine was added to the flask. While stirring with a magnetic stirring bar (350–400 rpm), 12.9 ml (0.165 mol) epichlorohydrin was added cautiously to the mixture through a dropping funnel. A white flocculent occurred after about 45 min stirring. Stirring was continued for another 18 h at room temperature. Then the mixture was heated to 70° C. for 3 h. Solid particles which precipitated were filtered and washed with 30 ml toluene. The product was dispersed in 30 ml toluene and refluxed for 30 minute to remove paraffin residues, filtered, and washed with ethanol and water. To obtain HCl-free resin the product was transferred into 50 ml of (5%) NaOH solution and stirred for 2 H. After filtration, the white-yellow product was washed with excess of water and 20 ml of ethanol and dried at 50° C. for 24 h. under vacuo. The yield was 15.7 g (86.0%).

Determination of Accessible Amine Content:

Accessible amine content was determined according to the procedure described above and elsewhere [30]. For this purpose, 0.1722 g. of the resin sample was soaked into 25 ml of 1M HCl solution and left in contact overnight, while being stirred in a closed bottle. The excess of unreacted acid was titrated conductimetrically with 0.1 M NaOH solution. The accessible amine content was calculated as 11.9 mmol $NH_2$/g resin.

Swelling of the Resin Sample:

Disc shaped sample with a diameter of 1 cm and 3.3 mm thickness was prepared from 0.25 g dry polymer, by an IR pellet sampler under 10 tons/cm$^2$ of pressure. The disc was placed in a 100 ml volume sintered glass funnel, which was in a closed bottle containing 150 ml of acidified solution (pH=2) which was adjusted by adding HCl solution. The level of solution was adjusted so that the upper level was 5 cm higher than that of the sample. The bottle was sealed to prevent $CO_2$ uptake which might cause shifts in pH.

The sample was allowed to stand in contact with solution for 6 weeks at room temperature. From time to time the glass funnel was taken out, filtered by suction, and weighed. The swelling ratio (w/w$_0$) was found to be 14.3.

Determination of the Nitrite ion Concentrations:

Nitrite ion concentrations were determined by a colorimetric method which is described above and elsewhere [31]. This method is based on absorption measurements at 440 nm, which is characteristic for the nitroso derivative of 2,7-napthalenediol in acid solutions.

Determination of the Nitrate Loading Capacity:

In order to estimate maximum nitrite-loading capacity of the resin, a 0.5 g. resin sample was contacted with 30 ml of 15% HCl solution and left overnight. The swollen polymer was decanted and washed many times with distilled water. Then it was transferred into 50 ml of 0.6 M $NaNO_2$ solution, in which total amount of nitrite was about a 10% excess of the theoretical amine content. The mixture was stirred for 24 h at room temperature. The concentration of the nitrite ion remaining unreacted in the solution was determined colorimetrically. Sorbed nitrite content was calculated by differentiating nitrite contents of the starting and final solutions. Nitrite-loading capacity of the resin was found to be 11.7 mmol/g dry resin.

Kinetics of the Nitrite ion Sorption:

Kinetics of nitrite sorption was performed by a simple batch experiment as follows: 0.5 g sample of the polyamine resin was soaked into 50 ml of 0.2 M $NaNO_2$ solution. While stirring gently at appropriate times, aliquots were transferred into volumetric flasks by filtering. The sample solutions were diluted properly and their nitrite concentrations were assayed colorimetrically. The sorbed amounts were calculated by differentiating nitrite contents of the starting and final solutions.

Figure 18:
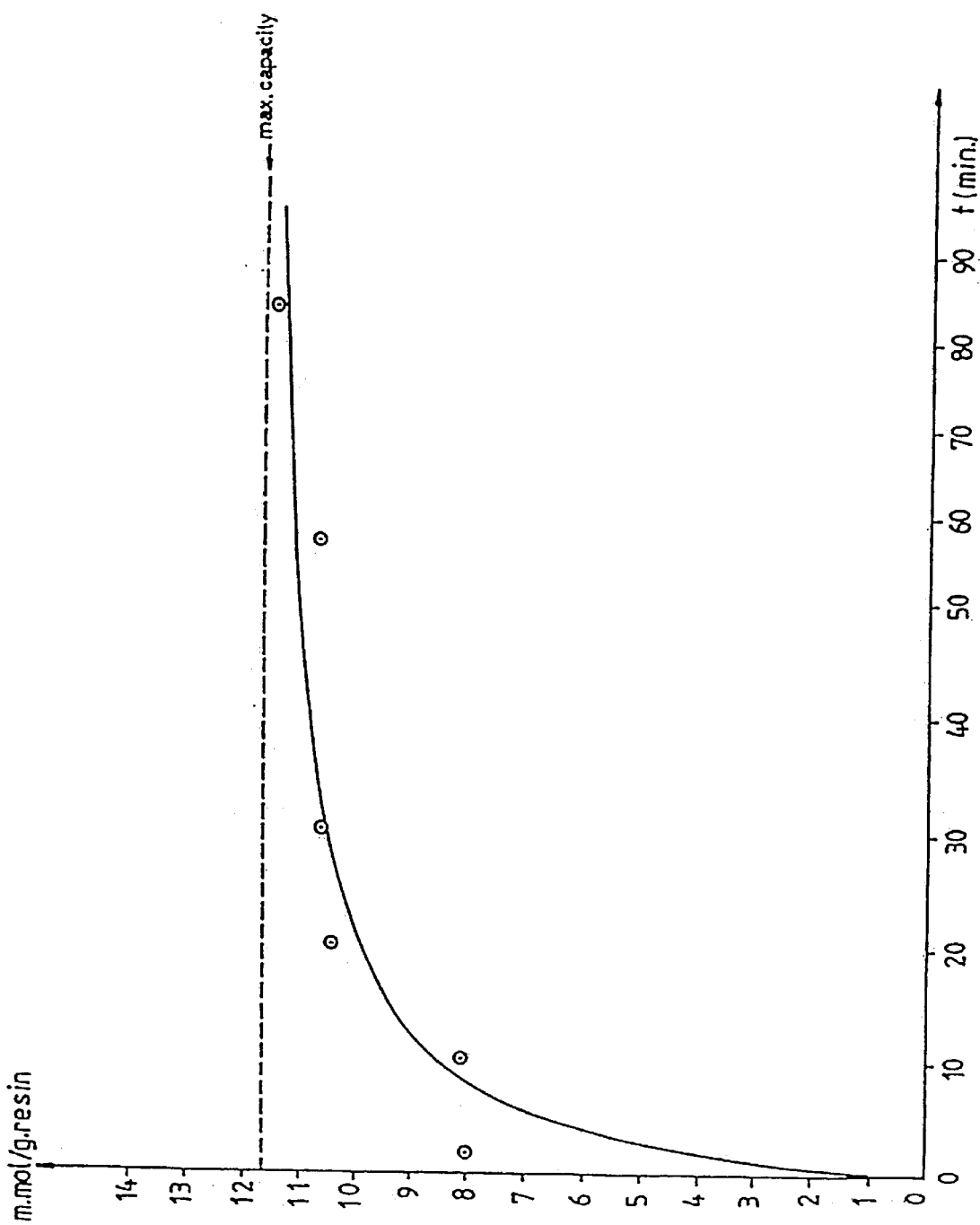
FIG. 18 shows the kinetics of nitrite sorption.

Efficiency For Trace Amounts:

First, 0.5 g of the resin sample was acidified as described above and interacted with 50 ml of 32.5 ppm $NO_2$ solution. Then, 2 ml aliquots were taken out at appropriate time intervals and their nitrite contents were assayed similarly. Variation of nitrite concentration of the solution was plotted as a function of time (FIG. 18.)

Desorption of the Nitrite Ions:

In concentrated acid solutions N-nitroso groups decompose to give nitrous acid. However, in acid solutions nitrous acid tends to escape as nitrogen oxides. To prevent nitrous acid escaping, a modified version of Libermann's qualitative method was used for quantitative determination of nitrous acid. For this purpose the desorption process was performed in acidified solution of 2,7-napthalenediol which serves as a trapping agent so that the nitrous acid is fixed as soon as it is liberated from the polymer. In the procedure, 50 mg of the loaded polymer is added to a 50 ml volume of 3M HCl solution containing 1.2 mmol 2,7-napthalenediol in a closed bottle. The mixture becomes red in a few minutes due to formation of 1-nitroso-2,7-napthalenediol. The mixture is stirred for 24 h at room temperature. Then, a 2 ml aliquot is used for direct determination of the nitrous acid content.

This determination reveals that nitrite ion content of the desorbing solution is 76% of the expected value. It is observed that heating for 3 h in 15% HCl solution is enough for a complete decomposition of N-nitroso groups. At the end of the desorption process the polymer is regenerated and becomes free of nitroso groups.

Results and Discussion:

As noted above, synthesis of some epoxy-amine polymers from ethylenediamine and epichlorohydrin has been described in some patent literatures [32, 33]. The reaction of epichlorohydrin with ethylenediamine is exothermic and severe explosions occur even when few milliliters of the reagents are contacted. The reaction can be achieved safely by suspension polycondensation using liquid paraffin as continuous phase, at about 0° C. Thermal curing of the precipitated polymer at 80° C. for 6 h gives rise to an insoluble resin. The reaction is believed to occur in two steps, i) ring opening of the epoxy group, and ii) condensation through the chloromethyl group.

Excess of epichlorohydrin leads to crosslinking as shown in FIG. 4.

To reinforce previous observations, nitrous acid test indicates that the product contains practically no primary amino groups. This result seems to be surprising. However, in a recent study it has been demonstrated that reactivity of primary amines toward epoxides is higher than that of the secondary amines [34]. Hence, the product consists essentially of secondary and tertiary amino groups. Swelling ratio of the resin in 1M HCl solution is about 14.3 (w/w$_0$).

Figure 17:
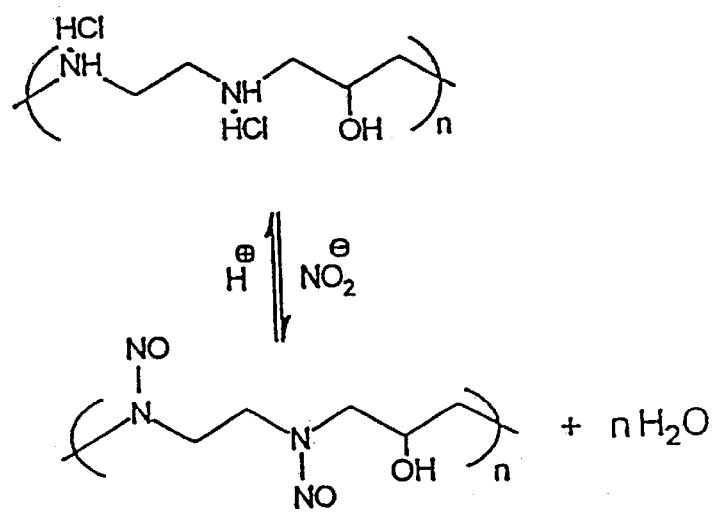
FIG. 17 illustrates the formation of N-nitroso resins in a form of the present invention.

Nitrate ion Sorption:

Acidified resin reacts with nitrite ions in aqua solutions to form N-nitroso compounds as shown in FIG. 17.

During this process the swelled resin sample shrinks and becomes light yellow in color. Nitrite loading capacity of the resin was found to be 11.7 mmol per g of HCl-free sample. This amount is 85.0% of the theoretical secondary amine content.

Figure 20:
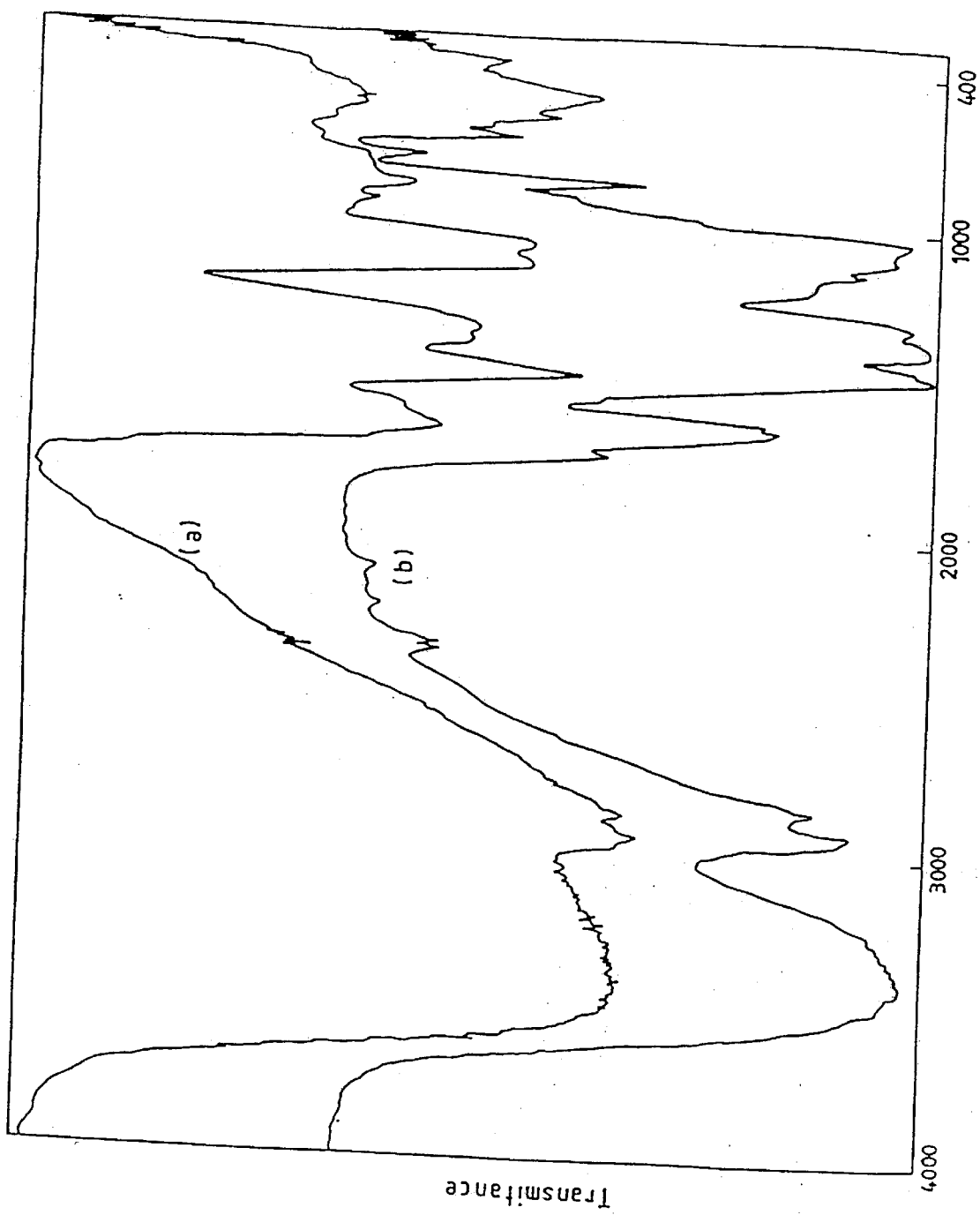
FIG. 20 FT-IR Spectra of (a) the original polymer; (b) the nitrite-loaded polymer.

In the FT-IR spectra of the nitroso-ated polymer, characteristic N—O stretching vibration is exhibited at 1490 $cm^{-1}$ (FIG. 20).

Figure 19:
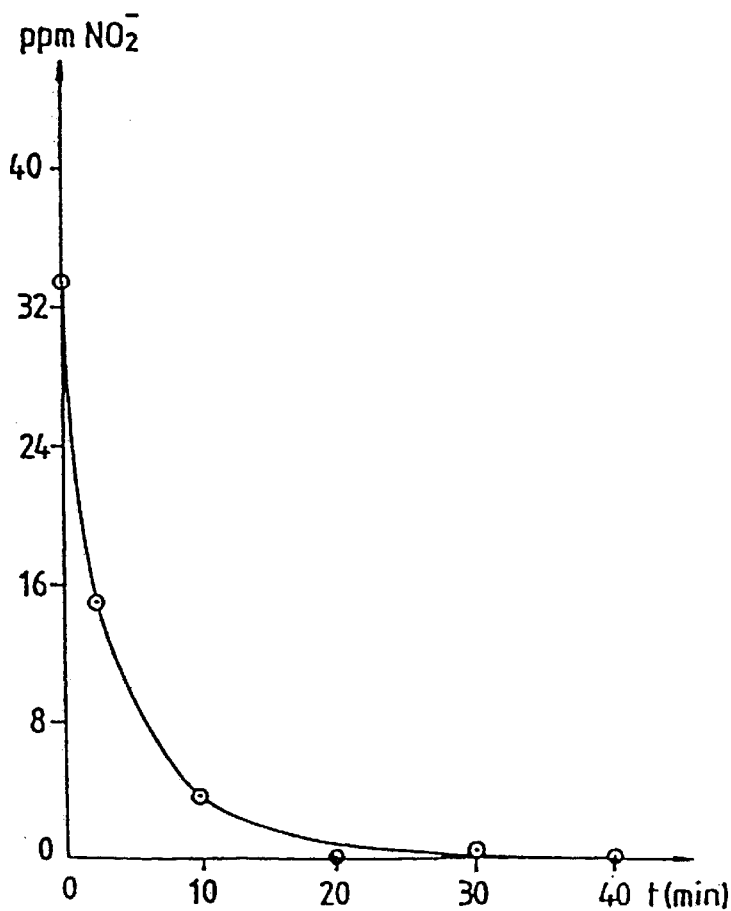
FIG. 19 is a concentration-time plot of the dilute nitrite solution contacting with 0.5 g polymer sample.

Kinetic experiments indicated that, in about 20 minutes, 90% of the nitrite content of the solution is consumed (FIG. 18). This amount is almost equal to the maximum sorption-capacity of the polymer. Also the polymer is quite sensitive to trace quantities. FIG. 19 represents that upon interacting 0.5 g of the acidified the polymer sample with 50 ml of nitrite solution, 32.5 ppm concentration closes to zero in about 20 minutes. Hence, nitrite binding of the polymer is reasonably fast and the equilibrium establishes in about 20 minutes.

The nitrite-loaded polymer decomposes in acid solutions to give nitrous acid. HCl salts of the secondary amine groups remain on the polymer. This process is the basis of the regeneration procedure. However, even in concentrated acid solutions (3M) desorption of the nitrite ions from the polymer does not go to completion at room temperature for 24 H. For a quantitative desorption, heating for 3 h. with 15% HCl solution is satisfactory. In this way the used polymer becomes regenerated. FT-IR spectra of the regenerated sample show almost the same pattern as those of the original sample. A simple test on the regenerated polymer shows that is nitrite-sorption capacity is very close to that of the original polymer sample. This is understandable because its structure does not contain hydrolyzable linkages in the main chain. According to studies relating with metal uptakes, some metal ions capable of anionic complexes, (especially in higher oxidation states such as Fe(III) or Cr(III)) can be sorbed as complex salts through ammonium cations in concentrated acid solutions, which might interfere with nitrite sorption. But in previous reports it has been asserted that this type of complexation is favored in high acid concentrations [35]. In the present invention the HCl form of the polymer is used and the pH of the solution during the nitrite sorption is between 3.2–6.4. This is not suitable for sorption of those kinds of metal ions. As a consequence, the polymeric sorbent of the present invention is highly selective for nitrite ions in the conditions disclosed. Its efficiency for trace quantities and regenerability makes it promising material for water purification. Its use in packed columns requires only taking into account or controlling swelling. This approach can be extended to the other polymeric materials possessing mainly secondary amine functions.

CROSSLINKED POLYSTYRENE SULFONAMIDES WITH OLIGOETHYLENEDIAMINES

Some non-epoxy, non-thio variations of the ethyleneimine-containing resins of the invention are also effective for separations and purifications. These include resins with a polystyrene backbone, sulfonated, and reacted to contain oligoethyleneimine pendent groups. For example, as shown in FIG. 21A, one can begin with crosslinked polystyrene, preferably in the form of 200–400 micron-size beads, which are readily available commercially.

Treatment with chlorosulfonic acid produces a chlorosulfonated polystyrene resin. Replacing the chlorine moiety with one of the oliogoethyleneimines such as ethylenediamine (EDA), diethylenetriamine (DETA), trimethylenetetramine (TETA), tetraethylenepentamine (TEPA) and pentaethylenehexamine (PEHA) results in a novel, useful resin and a starting material for various modifications to obtain novel polymeric sorbents.

Figures 21A, 21B:
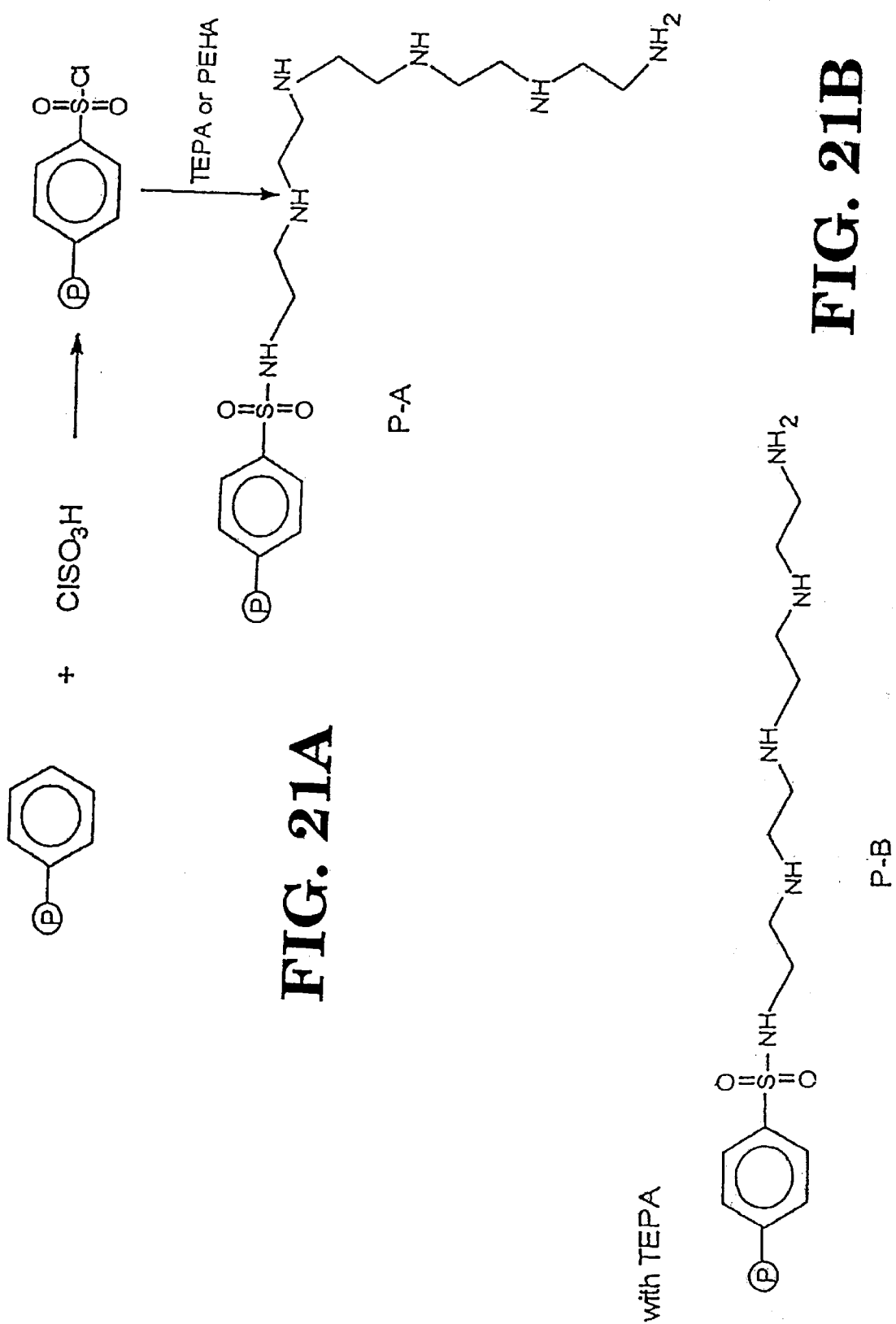

FIGS. 21A and 21B show, schematically, the results with PEHA and TEPA, respectively. These are the preferred basal sulfonamide materials for the present invention, and are referred to below as P-A and P-B, respectively.

Figure 21E:
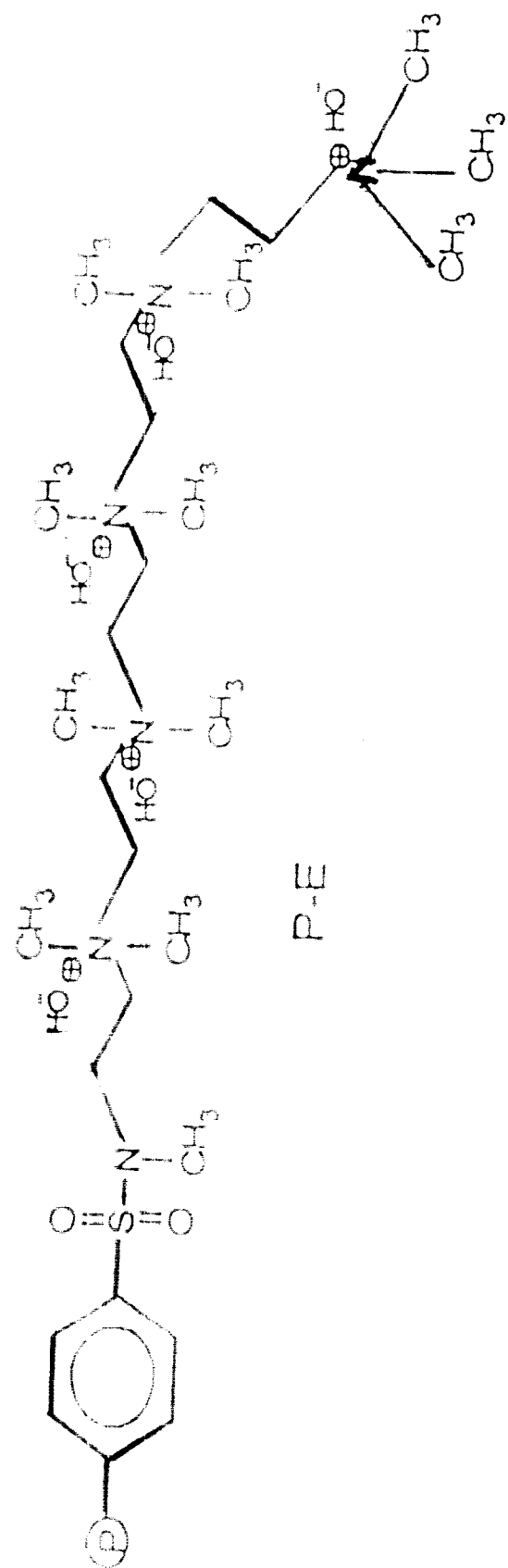

Useful modifications of these basal forms include, for example, the resins schematically disclosed in FIGS. 21C, 21D, and 21E.

FIG. 21C shows treatment of the oligoethyleneimine pendant group with formaldehyde and phosphorous acid to form the resin labeled "P-C".

FIG. 21D shows similar treatment, with formaldehyde and formic acid, to form the resin labeled "P-D", by the Eisweiler-Clarck process. This compound is an efficient sorbent of mustard gas (dichlorodiethyl sulfide.)

Methylating/quaternizing P-D gives the compound labeled P-E in FIG. 21E, which is a strong basic anion exchanger.

The basal material itself is believed to be novel but easily synthesized on a commercial scale. It is very efficient in metal ion uptake from aqua solutions. It is superior to a classical ion exchanger because it can sorb not only metal cations but also their accompanying anions. So it provides a complete purification of water.

The resin has unique properties. It has been found by the applicant to be useful in selective extraction of aldehydes from organic mixtures. It has surprising advantages over common methods such as liquid-liquid extraction, distillation and so on. By providing ease of separation, its usage can reduce investment capital and processing expenses. Using this resin, as with its above-described analogs, it is possible to pick up aldehydes selectively. Recovery of the sorbed aldehydes can be as simple a process as washing with dilute mineral acids.

Another application of the material in removal of nitrite ions from aqua solutions effectively. Nitrite removal from water is becoming very important, since nitrite ions are very harmful to human beings, being very reactive towards biomolecules and being extremely potent carcinogens. Its presence in drinking water, even in 1 ppm concentrations, has been strictly forbidden by health authorities all over the world. But, unfortunately, due to widespread exploitation of nitrogen-containing fertilizers, nitrite contamination is substantially increasing in water sources. It is produced by bacteriological fermentation of fertilizers such as urea, nitrates and ammonium compounds in soil.

These and other resins of the present invention satisfy a continuing and long-felt need for a method of removing nitrite ions from water. As discussed above, secondary amine functions on polymers can be very effective in removal of trace quantities of nitrite ions in water. The secondary amines in these pendant groups share this functionality. The polymer can be regenerated and reused many times without significant loss of activity. These resins are believed to be unique in their capacity for nitrite removal, while the inert backbone facilitates recycling without loss of integrity of the supporting structure.

Derivatives, including those specifically described herein are useful as polymeric chelating agents (including for radio-active trace entities) and new anion exchangers, with improved capacity compared to prior materials.

Derivatives of these later resins prepared with dithiocarbamate functionality on the pendant group (rather than the polymer backbone as previously described) share the useful properties described above for those previously disclosed dithiocarbamate resins.

REFERENCES

[1] I. T. Harrison and S. Harrison, J. Am. Chem. Soc., 89 (1967) 5723.
[2] P. Hodge, J. Kemp, E. Khoshedel and G. M. Perry, Reactive Polymers, 3 (1985) 299.
[3] C. C. Leznoff an W. Sywanyk, J. Org. Chem., 41 (1977) 3203.
[4] Y. H. Chang and W. T. Ford, J. Org. Chem., 46 (1981) 3756.
[5] V. V. K. Prasad, P. A. Warne, S. Liverman, J. Steroid Biochem., 18 (1983) 257.
[6] H. W. Wanzlick, Chem. Ber., 86 (1953) 1463.
[7] N. Biçak, G. Koza and T. Atay, J. Appl. Polym. Sci., 61 (1996) 799.
[8] N. Biçak, T. Atay and G. Koza, J. Appl. Polym. Sci., (1997) (submitted).
[9] S. Siggia, ed., Quantitative Organic Analysis, 3.ed., John Wiley and Sons, N.Y. 1967, pp. 124–127.
[10] S. Siggia (Ed.), Quantitative Organic Analysis via Functional Groups, 3rd edition, John Wiley and Sons Inc. NY, 1967, pp. 470.
[11] A. Warshawsky in Synthesis and Separations Using Functional Polymers Eds. D. C. Sherrington and P. Hodge, John Wiley and Sons NY, 1988, pp. 365.
[12] N. Biçak and B. Filiz Senkal, J. Polym. Sci. Chem. Ed. (1997) (in press).
[13] M. Kaneko and E. Tsuchida, J. Polym. Sci. Macromol. Rev., 1b, 398 (1981).
[14] A. Warshawsky, Angew. Macromol. Chem., 171, 1983.
[15] J. Bjerrum, G. Schwarzenbach and L. G. Sillen (eds.), Stability Constants of Metal Ion Complexes, London, 1958.
[16] G. D. Jones, D. C. McWilliams and N. A. Braxtor, J. Org. Chem. 30, 1994, (1965).
[17] A. Levy and Litt, O. Polym. Sci., A-1, 6, 57 (1968).
[18] D. J. Dawson, R. D. Gless and R. E. Wingard, O. Am. Chem. Soc., 98, 5996 (1976).
[19] D. D. Reynolds and W. O. Kengen, J. Am. Chem. Soc., 69, 911 (1947).
[20] R. Hart, Macromol. Chem., 32, 51 (1959)
[21] N. Biçak, G. Koza, T. Atay and F. Senkal, Reactive Polymers, 21, 135 (1993).
[22] N. Biçak, G. Koza and T. Atay, J. Appl. Polym. Sci., 61, 799 (1996).
[23] C. R. Hauser and D. N. Van Eenam, J. Am. Chem. Soc., 78, 5698 (1976).
[24] S. A. Fisher, U.S. Pat. No. 5,116,887 (to Henkel Corp. May 1992).
[25] Quantitative Org. Analysis via Functional Groups, 3 Ed., Sidney Siggia, John Wiley and Sons Inc. NY 1967, pp. 470.
[26] H. Noureddini and D. C. Timm, Polym. Gels and Networks, 2, 205 (1994).
[27] A. Warshawsky, R. Kalir, H. Bercovitz and A. Patchornik, J. Am. Chem. Soc., 101, 4249 (1979).
[28] N. Biçak, N. Acikkaya and G. Koza, Polymer Bulletin (1997) (submitted).
[29] Sidney Siggia (Ed.), Quantitative Organic Analysis Via Functional Groups 3rd Edition, John Wiley and Sons, Inc., NY, 1967, p. 470.
[30] N. Biçak, G. Koza and T. Ajay, J. Appl. Polym. Sci., 61 (1996) 799.
[31] N. Biçak, N. Tan and Ö. Bekarglu, Revue Roumaine de Chimie, 33, 4 (1988), 405–412
[32] S. A. Fisher, U.S. Pat. No. 5,116,887 (1992) (To Henkel Corp.)
[33] J. R. Dudley and L. A. Lundberg, U.S. Pat. No. 2,469,683 (1949) (To Cyanamide Corp.)
[34] H. Noureddini and D. C. Timm, Polymer Gels and Network, 2 (1994) 205.
[35] A. Warshawsky, R. Kalir, H. Bercovitz and A. Patchomik, J. Am. Chem. Soc., 101 (1979) 4249.

Clearly, minor changes could be made in the form and construction of this invention without departing from its material spirit. Therefore, it is not desired to confine the invention to the exact form shown herein and described, but is desired to include all subject matter that properly comes within the scope claimed.

The invention having been thus described, what is claimed as new and desired to secure by Letters Patent is:

1. A water-insoluble polymer resin comprising a cross-linked polystyrene backbone which is sulfonated and S-substituted with a covalently bound pendant oligoethyleneimine.

2. The water insoluble polymer resin of claim 1 wherein said oligoethyleneimine is selected from the group consisting of ethylenediamine (EDA), diethylenetriamine (DETA), trimethylenetetraamine (TETA), tetraethylenepentamine (TEPA) and pentaethylenehexamine (PEHA).

3. The water-insoluble polymer resin of claim 1 wherein said oligoethyleneimine is pentaethylenehexamine (PEHA).

4. The water-insoluble polymer resin of claim 1 wherein said oligoethyleneimine is tetraethylenepentamine (TEPA).

5. The water-insoluble resin of claim 1 wherein said oligoethyleneimine is N-substituted with a moiety selected from the group consisting of CH3PO3H and CH3.

6. The water-insoluble resin of claim 1 wherein said oligoethyleneimine is N-quarternized.

* * * * *